(12) United States Patent
Karabinis et al.

(10) Patent No.: US 8,412,126 B2
(45) Date of Patent: Apr. 2, 2013

(54) COMMUNICATIONS SYSTEMS INCLUDING ADAPTIVE ANTENNA SYSTEMS AND METHODS FOR INTER-SYSTEM AND INTRA-SYSTEM INTERFERENCE REDUCTION

(75) Inventors: Peter D. Karabinis, Cary, NC (US); Dunmin Zheng, Vienna, VA (US)

(73) Assignee: ATC Technologies, LLC, Reston, VA (US)

( * ) Notice: Subject to any disclaimer, the term of this patent is extended or adjusted under 35 U.S.C. 154(b) by 465 days.

(21) Appl. No.: 12/752,644

(22) Filed: Apr. 1, 2010

(65) Prior Publication Data

US 2010/0190507 A1 Jul. 29, 2010

Related U.S. Application Data

(62) Division of application No. 11/449,115, filed on Jun. 8, 2006, now Pat. No. 7,817,967.

(60) Provisional application No. 60/692,404, filed on Jun. 21, 2005, provisional application No. 60/707,418, filed on Aug. 11, 2005, provisional application No. 60/787,052, filed on Mar. 29, 2006.

(51) Int. Cl.
*H03C 7/02* (2006.01)

(52) U.S. Cl. ...... 455/101; 455/63.1; 455/65; 455/67.16; 455/69; 455/553.1; 455/103; 375/260; 375/267; 375/299; 370/264; 370/265; 370/464; 342/463; 342/423; 342/140; 342/157; 342/163

(58) Field of Classification Search ............... 455/63.1, 455/65, 67.16, 69, 553.1, 101, 103, 463, 455/423, 437, 444, 445, 140, 147, 157, 163, 455/354, 357.2, 422, 464, 465; 375/260, 375/267, 299; 370/264, 265, 464; 342/463, 342/342/423, 437, 444, 445, 140, 147, 157, 342/163, 354, 357.2, 422, 464, 465

See application file for complete search history.

(56) References Cited

U.S. PATENT DOCUMENTS

| | | | |
|---|---|---|---|
| 4,901,307 | A | 2/1990 | Gilhousen et al. |
| 5,073,900 | A | 12/1991 | Mallinckrodt |

(Continued)

FOREIGN PATENT DOCUMENTS

| | | | |
|---|---|---|---|
| EP | 0 506 255 | A2 | 9/1992 |
| EP | 0 597 225 | A1 | 5/1994 |

(Continued)

OTHER PUBLICATIONS

Constantine Balanis, Text Title: Antenna Theory, Wiley & Sons, $3^{rd}$ Edition, pp. 945-953.*

(Continued)

*Primary Examiner* — Patrick Edouard
*Assistant Examiner* — Fred Casca
(74) *Attorney, Agent, or Firm* — Myers Bigel Sibley & Sajovec

(57) ABSTRACT

Methods of forming a downlink beam in an adaptive antenna system of a communications system that may reduce inter-system and/or intra-system interference include receiving vectors of signals including signals transmitted by user terminals of the communications system and signals transmitted by transceivers of an independent communications system, obtaining spatial information for the user terminals of the communications system and the transceivers of the independent communications system, generating complex transmitting weights that form spatial nulls directed at the transceivers of the independent communications system, and transmitting a downlink communications signal using the complex transmitting weights. Related systems are also disclosed.

18 Claims, 11 Drawing Sheets

U.S. PATENT DOCUMENTS

| | | | |
|---|---|---|---|
| 5,303,286 A | 4/1994 | Wiedeman | |
| 5,339,330 A | 8/1994 | Mallinckrodt | |
| 5,343,211 A * | 8/1994 | Kott | 342/379 |
| 5,394,561 A | 2/1995 | Freeburg | |
| 5,446,756 A | 8/1995 | Mallinckrodt | |
| 5,448,623 A | 9/1995 | Wiedeman et al. | |
| 5,511,233 A | 4/1996 | Otten | |
| 5,555,257 A | 9/1996 | Dent | |
| 5,584,046 A | 12/1996 | Martinez et al. | |
| 5,612,703 A | 3/1997 | Mallinckrodt | |
| 5,619,525 A | 4/1997 | Wiedeman et al. | |
| 5,631,898 A | 5/1997 | Dent | |
| 5,761,605 A | 6/1998 | Tawil et al. | |
| 5,765,098 A | 6/1998 | Bella | |
| 5,812,947 A | 9/1998 | Dent | |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,878,329 A | 3/1999 | Mallinckrodt | |
| 5,884,142 A | 3/1999 | Wiedeman et al. | |
| 5,907,541 A | 5/1999 | Fairholm et al. | |
| 5,926,758 A | 7/1999 | Grybos et al. | |
| 5,937,332 A | 8/1999 | Karabinis | |
| 5,940,753 A | 8/1999 | Mallinckrodt | |
| 5,991,345 A | 11/1999 | Ramasastry | |
| 5,995,832 A | 11/1999 | Mallinckrodt | |
| 6,011,951 A | 1/2000 | King et al. | |
| 6,023,605 A | 2/2000 | Sasaki et al. | |
| 6,052,560 A | 4/2000 | Karabinis | |
| 6,052,586 A | 4/2000 | Karabinis | |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,134,437 A | 10/2000 | Karabinis et al. | |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,233,463 B1 | 5/2001 | Wiedeman et al. | |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,324,405 B1 | 11/2001 | Young et al. | |
| 6,339,707 B1 | 1/2002 | Wainfan et al. | |
| 6,418,147 B1 | 7/2002 | Wiedeman | |
| 6,449,461 B1 | 9/2002 | Otten | |
| 6,504,515 B1 | 1/2003 | Holt et al. | |
| 6,522,865 B1 | 2/2003 | Otten | |
| 6,628,919 B1 | 9/2003 | Curello et al. | |
| 6,684,057 B2 | 1/2004 | Karabinis | |
| 6,735,437 B2 | 5/2004 | Mayfield et al. | |
| 6,775,251 B1 | 8/2004 | Wiedeman et al. | |
| 6,785,543 B2 | 8/2004 | Karabinis | |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,937,857 B2 | 8/2005 | Karabinis | |
| 6,975,837 B1 | 12/2005 | Santoru | |
| 6,999,720 B2 | 2/2006 | Karabinis | |
| 7,006,789 B2 | 2/2006 | Karabinis et al. | |
| 7,031,702 B2 | 4/2006 | Karabinis et al. | |
| 7,039,400 B2 | 5/2006 | Karabinis et al. | |
| 7,062,267 B2 | 6/2006 | Karabinis | |
| 7,092,708 B2 | 8/2006 | Karabinis | |
| 7,113,743 B2 | 9/2006 | Karabinis | |
| 7,113,778 B2 | 9/2006 | Karabinis | |
| 7,155,340 B2 | 12/2006 | Churan | |
| 7,174,127 B2 | 2/2007 | Otten et al. | |
| 7,181,161 B2 | 2/2007 | Karabinis | |
| 7,203,490 B2 | 4/2007 | Karabinis | |
| 7,218,931 B2 | 5/2007 | Karabinis | |
| 7,295,807 B2 | 11/2007 | Karabinis | |
| 7,340,213 B2 | 3/2008 | Karabinis et al. | |
| 7,418,236 B2 | 8/2008 | Levin et al. | |
| 7,418,263 B2 | 8/2008 | Dutta et al. | |
| 7,421,342 B2 | 9/2008 | Churan | |
| 7,437,123 B2 | 10/2008 | Karabinis et al. | |
| 7,444,170 B2 | 10/2008 | Karabinis | |
| 7,447,501 B2 | 11/2008 | Karabinis | |
| 7,453,396 B2 | 11/2008 | Levin et al. | |
| 7,453,920 B2 | 11/2008 | Churan | |
| 7,454,175 B2 | 11/2008 | Karabinis | |
| 7,457,269 B1 | 11/2008 | Grayson | |
| 7,558,568 B2 | 7/2009 | Karabinis | |
| 7,574,206 B2 | 8/2009 | Karabinis | |
| 7,577,400 B2 | 8/2009 | Karabinis et al. | |
| 7,587,171 B2 | 9/2009 | Evans et al. | |
| 7,593,691 B2 | 9/2009 | Karabinis | |
| 7,593,724 B2 | 9/2009 | Karabinis | |
| 7,593,725 B2 | 9/2009 | Karabinis | |
| 7,593,726 B2 | 9/2009 | Karabinis et al. | |
| 7,596,111 B2 | 9/2009 | Karabinis | |
| 7,599,656 B2 | 10/2009 | Karabinis | |
| 7,603,081 B2 | 10/2009 | Karabinis | |
| 7,603,117 B2 | 10/2009 | Karabinis | |
| 7,606,590 B2 | 10/2009 | Karabinis | |
| 7,609,666 B2 | 10/2009 | Karabinis | |
| 7,620,394 B2 | 11/2009 | Good et al. | |
| 7,623,859 B2 | 11/2009 | Karabinis | |
| 7,623,867 B2 | 11/2009 | Karabinis | |
| 7,627,285 B2 | 12/2009 | Karabinis | |
| 7,634,229 B2 | 12/2009 | Karabinis | |
| 7,634,234 B2 | 12/2009 | Karabinis | |
| 7,636,546 B2 | 12/2009 | Karabinis | |
| 7,636,566 B2 | 12/2009 | Karabinis | |
| 7,636,567 B2 | 12/2009 | Karabinis et al. | |
| 7,639,981 B2 | 12/2009 | Karabinis | |
| 7,653,348 B2 | 1/2010 | Karabinis | |
| 7,664,460 B2 | 2/2010 | Karabinis et al. | |
| 7,696,924 B2 | 4/2010 | Levin et al. | |
| 2002/0061768 A1 | 5/2002 | Liang et al. | |
| 2002/0122408 A1 | 9/2002 | Mullins | |
| 2002/0146979 A1 | 10/2002 | Regulinski et al. | |
| 2002/0177465 A1 | 11/2002 | Robinett | |
| 2003/0003815 A1 | 1/2003 | Yamada | |
| 2003/0017853 A1 * | 1/2003 | Kanamaluru et al. | 455/562 |
| 2003/0022625 A1 | 1/2003 | Otten et al. | |
| 2003/0032423 A1 * | 2/2003 | Boros et al. | 455/423 |
| 2003/0054762 A1 | 3/2003 | Karabinis | |
| 2003/0054814 A1 | 3/2003 | Karabinis et al. | |
| 2003/0054815 A1 | 3/2003 | Karabinis | |
| 2003/0068078 A1 | 4/2003 | Karabinis et al. | |
| 2003/0073436 A1 | 4/2003 | Karabinis et al. | |
| 2003/0108084 A1 | 6/2003 | Bolourchi et al. | |
| 2003/0114193 A1 | 6/2003 | Kavak et al. | |
| 2003/0149986 A1 | 8/2003 | Mayfield et al. | |
| 2003/0153308 A1 | 8/2003 | Karabinis | |
| 2004/0072539 A1 | 4/2004 | Monte et al. | |
| 2004/0102156 A1 | 5/2004 | Loner | |
| 2004/0121727 A1 | 6/2004 | Karabinis | |
| 2004/0142660 A1 | 7/2004 | Churan | |
| 2004/0192200 A1 | 9/2004 | Karabinis | |
| 2004/0192293 A1 | 9/2004 | Karabinis | |
| 2004/0192395 A1 | 9/2004 | Karabinis | |
| 2004/0203393 A1 | 10/2004 | Chen | |
| 2004/0203742 A1 | 10/2004 | Karabinis | |
| 2004/0240525 A1 | 12/2004 | Karabinis et al. | |
| 2005/0026606 A1 | 2/2005 | Karabinis | |
| 2005/0037749 A1 | 2/2005 | Karabinis et al. | |
| 2005/0041619 A1 | 2/2005 | Karabinis et al. | |
| 2005/0054351 A1 * | 3/2005 | McAlexander | 455/456.1 |
| 2005/0064813 A1 | 3/2005 | Karabinis | |
| 2005/0079816 A1 | 4/2005 | Singh et al. | |
| 2005/0090256 A1 | 4/2005 | Dutta | |
| 2005/0118948 A1 | 6/2005 | Karabinis et al. | |
| 2005/0136836 A1 | 6/2005 | Karabinis et al. | |
| 2005/0164700 A1 | 7/2005 | Karabinis | |
| 2005/0164701 A1 | 7/2005 | Karabinis et al. | |

| | | |
|---|---|---|
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040613 A1 | 2/2006 | Karabinis et al. |
| 2006/0045038 A1* | 3/2006 | Kay et al. .............. 370/316 |
| 2006/0082501 A1* | 4/2006 | Chiang ................ 342/442 |
| 2006/0094420 A1 | 5/2006 | Karabinis |
| 2006/0111041 A1 | 5/2006 | Karabinis |
| 2006/0111056 A1 | 5/2006 | Dutta |
| 2006/0135058 A1 | 6/2006 | Karabinis |
| 2006/0135070 A1 | 6/2006 | Karabinis |
| 2006/0165120 A1 | 7/2006 | Karabinis |
| 2006/0189275 A1 | 8/2006 | Karabinis |
| 2006/0194576 A1 | 8/2006 | Karabinis et al. |
| 2006/0205347 A1 | 9/2006 | Karabinis |
| 2006/0205367 A1 | 9/2006 | Karabinis |
| 2006/0211452 A1 | 9/2006 | Karabinis |
| 2006/0217070 A1 | 9/2006 | Karabinis |
| 2006/0246838 A1 | 11/2006 | Karabinis |
| 2006/0252368 A1 | 11/2006 | Karabinis |
| 2006/0292990 A1 | 12/2006 | Karabinis et al. |
| 2007/0010246 A1 | 1/2007 | Churan |
| 2007/0015460 A1 | 1/2007 | Karabinis et al. |
| 2007/0021059 A1 | 1/2007 | Karabinis et al. |
| 2007/0021060 A1 | 1/2007 | Karabinis et al. |
| 2007/0037514 A1 | 2/2007 | Karabinis |
| 2007/0072545 A1 | 3/2007 | Karabinis et al. |
| 2007/0099562 A1 | 5/2007 | Karabinis et al. |
| 2007/0123252 A1 | 5/2007 | Tronc et al. |
| 2007/0129019 A1 | 6/2007 | Otten et al. |
| 2007/0135051 A1 | 6/2007 | Zheng et al. |
| 2007/0184849 A1 | 8/2007 | Zheng |
| 2007/0192805 A1 | 8/2007 | Dutta et al. |
| 2007/0202816 A1 | 8/2007 | Zheng |
| 2007/0232298 A1 | 10/2007 | Karabinis |
| 2007/0243866 A1 | 10/2007 | Karabinis |
| 2007/0281612 A1 | 12/2007 | Benjamin et al. |
| 2007/0293214 A1 | 12/2007 | Ansari et al. |
| 2008/0008264 A1 | 1/2008 | Zheng |
| 2008/0032671 A1 | 2/2008 | Karabinis |
| 2008/0032690 A1 | 2/2008 | Karabinis |
| 2008/0113666 A1 | 5/2008 | Monte et al. |
| 2008/0119190 A1 | 5/2008 | Karabinis |
| 2008/0160993 A1 | 7/2008 | Levin et al. |
| 2008/0182572 A1 | 7/2008 | Tseytlin et al. |
| 2008/0214207 A1 | 9/2008 | Karabinis |
| 2008/0268836 A1 | 10/2008 | Karabinis et al. |
| 2009/0011704 A1 | 1/2009 | Karabinis |
| 2009/0029696 A1 | 1/2009 | Karabinis |
| 2009/0042509 A1 | 2/2009 | Karabinis et al. |
| 2009/0042516 A1 | 2/2009 | Karabinis |
| 2009/0075645 A1 | 3/2009 | Karabinis |
| 2009/0088151 A1 | 4/2009 | Karabinis |
| 2009/0104903 A1 | 4/2009 | Karabinis |
| 2009/0131046 A1 | 5/2009 | Karabinis et al. |
| 2009/0137203 A1 | 5/2009 | Karabinis et al. |
| 2009/0156154 A1 | 6/2009 | Karabinis et al. |
| 2009/0170427 A1 | 7/2009 | Karabinis |
| 2009/0170428 A1 | 7/2009 | Karabinis |
| 2009/0170429 A1 | 7/2009 | Karabinis |
| 2009/0186622 A1 | 7/2009 | Karabinis |
| 2009/0231187 A1 | 9/2009 | Churan |
| 2009/0264120 A1 | 10/2009 | Karabinis |
| 2009/0296628 A1 | 12/2009 | Karabinis |
| 2009/0305697 A1 | 12/2009 | Karabinis et al. |
| 2009/0312013 A1 | 12/2009 | Karabinis |
| 2010/0009677 A1 | 1/2010 | Karabinis et al. |
| 2010/0015971 A1 | 1/2010 | Good et al. |
| 2010/0029269 A1 | 2/2010 | Karabinis |
| 2010/0035604 A1 | 2/2010 | Dutta et al. |
| 2010/0035605 A1 | 2/2010 | Karabinis |
| 2010/0035606 A1 | 2/2010 | Karabinis |
| 2010/0039967 A1 | 2/2010 | Karabinis et al. |
| 2010/0041394 A1 | 2/2010 | Karabinis |
| 2010/0041395 A1 | 2/2010 | Karabinis |
| 2010/0041396 A1 | 2/2010 | Karabinis |
| 2010/0048201 A1 | 2/2010 | Karabinis |
| 2010/0054160 A1 | 3/2010 | Karabinis |

FOREIGN PATENT DOCUMENTS

| | | |
|---|---|---|
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| EP | 1 944 885 A2 | 7/2008 |
| EP | 1 569 363 B1 | 11/2008 |
| WO | WO 01/54314 A1 | 7/2001 |
| WO | WO 02/51033 | 6/2002 |

OTHER PUBLICATIONS

Jason Goldberg, Downlink Beamforming for Cellular Mobile Communications, IEEE 1997, pp. 632-636.*

John Litva, Text title: Digital Beamforming in Wireless Communications, Artech House Inc, pp. 35-43.*

Andrea Goldsmith, Text title: Wireless Communications, Cambridge University Press, First Edition, pp. 321-343.*

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

Asté et al. "Downlink beamforming for cellular mobile communications (GSM system)" *Annals of Telecommunications*, 53, Nov. 1998, pp. 435-448.

International Search Report and Written Opinion for International Application No. PCT/US2006/023835, mailed Oct. 24, 2006.

* cited by examiner

COMMUNICATIONS SYSTEMS INCLUDING ADAPTIVE ANTENNA SYSTEMS AND METHODS FOR INTER-SYSTEM AND INTRA-SYSTEM INTERFERENCE REDUCTION

RELATED APPLICATIONS

This application is a divisional of U.S. patent application Ser. No. 11/449,115 filed Jun. 8, 2006, now U.S. Pat. No. 7,817,967 which claims the benefit of and priority to U.S. Provisional Patent Application No. 60/692,404 entitled "Systems And Methods Of Interference Reduction To Satellite Terminals Using Ancillary Terrestrial Components With Smart Antennas," filed Jun. 21, 2005, U.S. Provisional Patent Application No. 60/707,418 entitled "Systems and Methods for Reducing Inter- and Intra-System Interference by Adaptive Beam Forming Antennas," filed Aug. 11, 2005, and U.S. Provisional Patent Application No. 60/787,052 entitled "Adaptive Antenna Systems And Methods For Inter-System Interference Reduction," filed Mar. 29, 2006, the disclosures of which are hereby incorporated herein by reference as if set forth in their entirety.

FIELD OF THE INVENTION

This invention relates to wireless communications systems and methods, and more particularly to antenna systems and methods for terrestrial and/or satellite wireless communications systems.

BACKGROUND

Satellite radiotelephone communications systems and methods are widely used for radiotelephone communications. Satellite radiotelephone communications systems and methods generally employ at least one space-based component, such as one or more satellites, that is/are configured to wirelessly communicate with a plurality of satellite radiotelephones.

A satellite radiotelephone communications system or method may utilize a single satellite antenna pattern (beam or cell) covering an entire service region served by the system. Alternatively or in combination with the above, in cellular satellite radiotelephone communications systems and methods, multiple satellite antenna patterns (beams or cells) are provided, each of which can serve a substantially distinct service region in an overall service region, to collectively provide service to the overall service region. Thus, a cellular architecture similar to that used in conventional terrestrial cellular radiotelephone systems and methods can be implemented in cellular satellite-based systems and methods. The satellite typically communicates with radiotelephones over a bidirectional communications pathway, with radiotelephone communications signals being communicated from the satellite to the radiotelephone over a downlink or forward link (also referred to as forward service link), and from the radiotelephone to the satellite over an uplink or return link (also referred to as return service link). In some cases, such as, for example, in broadcasting, the satellite may communicate information to one or more radioterminals unidirectionally.

The overall design and operation of cellular satellite radiotelephone systems and methods are well known to those having skill in the art, and need not be described further herein. Moreover, as used herein, the term "radiotelephone" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and/or a pager, Internet/Intranet access, Web browser, organizer, calendar and/or a global positioning system (GPS) receiver; and/or conventional laptop and/or palmtop computers or other appliances, which include a radio frequency transceiver. A radiotelephone also may be referred to herein as a "radioterminal", a "mobile terminal" or simply as a "terminal". As used herein, the term(s) "radioterminal," "radiotelephone," mobile terminal" and/or "terminal" also include(s) any other radiating user device/equipment/source that may have time-varying or fixed geographic coordinates and/or may be portable, transportable, installed in a vehicle (aeronautical, maritime, or land-based) and/or situated and/or configured to operate locally and/or in a distributed fashion over one or more terrestrial and/or extra-terrestrial location(s). Furthermore, as used herein, the term "space-based component" or "space-based system" includes one or more satellites at any orbit (geostationary, substantially geostationary, medium earth orbit, low earth orbit, etc.) and/or one or more other objects and/or platforms (e.g., airplanes, balloons, unmanned vehicles, space crafts, missiles, etc.) that has/have a trajectory above the earth at any altitude.

Terrestrial networks can enhance cellular satellite radiotelephone system availability, efficiency and/or economic viability by terrestrially using/reusing at least some of the frequencies that are allocated to cellular satellite radiotelephone systems. In particular, it is known that it may be difficult for cellular satellite radiotelephone systems to reliably serve densely populated areas, because satellite signals may be blocked by high-rise structures and/or may not penetrate into buildings. As a result, satellite spectrum may be underutilized or unutilized in such areas. The terrestrial use/reuse of at least some of the satellite system frequencies can reduce or eliminate this potential problem.

Moreover, the capacity of an overall hybrid system, comprising space-based (i.e., satellite) and terrestrial communications capability, may be increased by the introduction of terrestrial frequency use/reuse of frequencies authorized for use by the space-based component, since terrestrial frequency use/reuse may be much denser than that of a satellite-only system. In fact, capacity may be enhanced where it may be mostly needed, i.e., in densely populated urban/industrial/commercial areas. As a result, the overall system may become more economically viable, as it may be able to serve more effectively and reliably a larger subscriber base.

One example of terrestrial reuse of satellite frequencies is described in U.S. Pat. No. 5,937,332 to co-inventor Karabinis entitled Satellite Telecommunications Repeaters and Retransmission Methods, the disclosure of which is hereby incorporated herein by reference in its entirety as if set forth fully herein. As described therein, satellite telecommunications repeaters are provided which receive, amplify, and locally retransmit the downlink/uplink signal received from a satellite/radioterminal thereby increasing an effective downlink/uplink margin in the vicinity of the satellite telecommunications repeater and allowing an increase in the penetration of uplink and downlink signals into buildings, foliage, transportation vehicles, and other objects which can reduce link margin. Both portable and non-portable repeaters are provided. See the abstract of U.S. Pat. No. 5,937,332.

Satellite radiotelephones for a satellite radiotelephone system or method having a terrestrial communications capability by terrestrially using/reusing at least some of the same satellite frequency band and using substantially the same air interface for both terrestrial and satellite communications may be cost effective and/or aesthetically appealing. Conventional dual band/dual mode radiotelephone alternatives, such as the well known Thuraya, Iridium and/or Globalstar dual mode satellite/terrestrial radiotelephones, duplicate some components (as a result of the different frequency bands and/or air interface protocols between satellite and terrestrial communications), which leads to increased cost, size and/or weight of the radiotelephone. See U.S. Pat. No. 6,052,560 to co-inventor Karabinis, entitled Satellite System Utilizing a Plurality of Air Interface Standards and Method Employing Same.

Satellite radioterminal communications systems and methods that may employ terrestrial use and/or reuse of satellite frequencies by an Ancillary Terrestrial Network (ATN) comprising at least one Ancillary Terrestrial Component (ATC) are also described in U.S. Pat. No. 6,684,057 to Karabinis, entitled Systems and Methods for Terrestrial Reuse of Cellular Satellite Frequency Spectrum; U.S. Pat. No. 6,785,543 to Karabinis, entitled Filters for Combined Radiotelephone/GPS Terminals; U.S. Pat. No. 6,856,787 to Karabinis, entitled Wireless Communications Systems and Methods Using Satellite-Linked Remote Terminal Interface Subsystems; U.S. Pat. No. 6,859,652 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; and U.S. Pat. No. 6,879,829 to Dutta et al., entitled Systems and Methods for Handover Between Space Based and Terrestrial Radioterminal Communications, and For Monitoring Terrestrially Reused Satellite Frequencies At a Radioterminal to Reduce Potential Interference, and in U.S. Pat. Nos. 6,892,068, 6,937,857, 6,999,720 and 7,006,789; and Published U.S. Patent Application Nos. US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0073436 to Karabinis et al., entitled Additional Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2002/0041575 to Karabinis et al., entitled Coordinated Satellite-Terrestrial Frequency Reuse; US 2003/0068978 to Karabinis et al., entitled Space-Based Network Architectures for Satellite Radiotelephone Systems; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, and in Published U.S. Patent Application Nos. 2004/0121727, 2004/0142660, 2004/0192395, 2004/0192200, 2004/0192293, 2004/0203742, 2004/0240525, 2005/0026606, 2005/0037749, 2005/0041619, 2005/0064813, 2005/0079816, 2005/0090256, 2005/0118948, 2005/0136836, 2005/0164700, 2005/0164701, 2005/0170834, 2005/0181786, 2005/0201449, 2005/0208890, 2005/0221757, 2005/0227618, 2005/0239457, 2005/0239403, 2005/0239404, 2005/0239399, 2005/0245192, 2005/0260984, 2005/0260947, 2005/0265273, 2005/00272369, 2005/0282542, 2005/0288011, 2006/0040613, 2006/040657 and 2006/0040659; all of which are assigned to the assignee of the present invention, the disclosures of all of which are hereby incorporated herein by reference in their entirety as if set forth fully herein.

Many of the above-cited patents and publications can reduce or eliminate intra-system interference that is caused by terrestrial use and/or reuse of satellite frequencies by an ancillary terrestrial network. However, inter-system interference also can be caused by terrestrial use and/or reuse of satellite frequencies by an ancillary terrestrial network and/or radioterminals communicating therewith, due to, for example, the potential production of out-of-band and/or out-of-channel emissions by a radioterminal that is transmitting over a satellite frequency band.

SUMMARY

Methods of forming a downlink beam in an adaptive antenna system of a communications system according to some embodiments of the invention include receiving vectors of signals including signals transmitted by user terminals of the communications system and signals transmitted by transceivers of an independent communications system, obtaining spatial information for the user terminals of the communications system and the transceivers of the independent communications system, generating complex transmitting weights that form spatial nulls directed at the transceivers of the independent communications system, and transmitting a downlink communications signal using the complex transmitting weights.

Receiving vectors of signals may include receiving vectors of signals using an antenna array including a number of antenna feed elements, and a respective one of the complex transmitting weights is associated with a corresponding one of the antenna feed elements.

Obtaining spatial information for the user terminals of the communications system and the transceivers of the independent communications system may include obtaining the spatial information using the received vectors of signals.

Obtaining spatial information for the user terminals of the communications system may include performing pseudo uplink beamforming, and obtaining spatial information for the transceivers of the independent communications system may include using blind spatial channel estimation. Obtaining spatial information may further include generating estimates of an array covariance matrix using the signals transmitted by the user terminals of the communications system and the signals transmitted by the transceivers of an independent communications system.

Generating estimates of the array covariance matrix may include obtaining estimates of spatial signatures of the user terminals of the communications system using a preamble or pilot signal reference.

Generating estimates of the array covariance matrix may include estimating a covariance matrix for the transceivers of the independent communications system, estimating a covariance matrix for the user terminals of the communications system, and deriving a composite covariance matrix by combining the covariance matrix for the transceivers of the independent communications system with the covariance matrix for the user terminals of the communications system.

The methods may further include performing frequency transformation of the covariance matrix for the transceivers of the independent communications system to transform a frequency of the covariance matrix for the transceivers of the independent communications system to a frequency of the communications system.

Generating complex transmitting weights may include generating a set of pseudo uplink beamforming weights by combining the estimates of the spatial signatures of user terminals of the communications system with the composite covariance matrix, and transmitting a downlink communications signal using the complex transmitting weights may include transmitting a downlink communications signal using the pseudo uplink beamforming weights transmitting weights.

Obtaining spatial information for the user terminals of the communications system and/or the transceivers of the independent communications system may include obtaining spatial signatures using an angle of arrival estimation algorithm.

Obtaining spatial information for the transceivers of the independent communications system may further include estimating angle of arrival information of the signals from the transceivers of the independent communications system using a maximum likelihood angle of arrival estimation algorithm, and generating spatial signatures of the transceivers of the independent communications system using the angle of arrival information.

The communications system may be configured to communicate with user terminals using a time division duplex communications protocol.

Obtaining spatial information for the transceivers of the independent communications system may include generating estimates of a covariance matrix using the signals transmitted by the transceivers of an independent communications system and decomposing the covariance matrix to obtain the principal eigenvector of the covariance matrix or the K eigenvectors corresponding to the K largest eigenvalues, where K represents the number of transceivers of the independent communications system.

Receiving signals transmitted by transceivers of an independent communications system may include receiving pilot or carrier signals transmitted by the transceivers of the independent communications system. In some embodiments, receiving signals transmitted by transceivers of an independent communications system may include receiving beacon signals transmitted by the transceivers of the independent communications system.

The methods may further include forming an uplink antenna pattern using the complex transmitting weights, receiving the beacon signals using the uplink antenna pattern, and measuring strength of the beacon signals received using the uplink antenna pattern, the strength of the beacon signals received using the uplink antenna pattern provides an error signal associated with the complex transmitting weights. The methods may further include adjusting the complex transmitting weights to reduce the strength of the beacon signals.

The adaptive antenna system may include a vertical uniform linear array of radiating elements, and generating complex transmitting weights that form spatial nulls directed at the transceivers of the independent communications system may include generating complex transmitting weights that form spatial nulls directed at angles of arrival associated with the transceivers of the independent communications system.

The adaptive antenna system may include a phased array antenna, and generating complex transmitting weights that form spatial nulls directed at the transceivers of the independent communications system may include generating complex transmitting weights that form spatial nulls directed at azimuth/elevation coordinates associated with the transceivers of the independent communications system.

The methods may include receiving the downlink communications signal at a user terminal of the communication system. The communications system comprises a terrestrial communications system.

Methods of generating a downlink transmission signal from a base transceiver system to a user terminal associated with the base transceiver system according to further embodiments of the invention include obtaining location information for a transceiver of an independent communications system not associated with the base transceiver system, generating complex transmitting weights for an adaptive antenna associated with the base transceiver system that form a spatial null directed at the transceiver of the independent communications system, and transmitting a downlink communications signal over the adaptive antenna system to the user terminal using the complex transmitting weights.

The adaptive antenna may include a plurality of vertical uniform linear array antennas, and generating complex transmitting weights may include generating complex transmitting weights that form a spatial null directed at an elevation associated with the transceiver of the independent communications system.

Obtaining location information for the transceiver of the independent communications system may include receiving a beacon signal from the transceiver of the independent communications system. The beacon signal may include an unmodulated carrier signal, a control channel signal and/or a traffic channel signal.

Generating the complex transmitting weights may include forming an uplink antenna pattern using the complex transmitting weights, receiving the beacon signal using the uplink antenna pattern, and measuring strength of the beacon signal received using the uplink antenna pattern, the strength of the beacon signal received using the uplink antenna pattern provides an error signal associated with the complex transmitting weights. The methods may further include adjusting the complex transmitting weights to reduce the strength of the beacon signals.

Transmitting the downlink communications signal may include transmitting a signal that is Left Hand Circularly Polarized (LHCP), Right Hand Circularly Polarized (RHCP), or Linearly Polarized (LP).

The methods may include receiving the downlink communications signal at a user terminal of the communication system. The communications system comprises a terrestrial communications system.

Some embodiments of the invention provide a base transceiver system of a communications system, including an antenna array configured to receive vectors of signals including signals transmitted by user terminals of the communications system and signals transmitted by transceivers of an independent communications system, and an electronics system coupled to the antenna array. The electronics system is configured to obtain spatial information for the user terminals of the communications system and the transceivers of the independent communications system, to generate complex transmitting weights that form spatial nulls directed at the transceivers of the independent communications system, and to transmit a downlink communications signal over the antenna array using the complex transmitting weights. The antenna array may include an array of antenna feed elements, and respective ones of the complex transmitting weights are associated with corresponding ones of the antenna feed elements. The electronics system may be configured to obtain spatial information for the user terminals of the communications system and the transceivers of the independent communications system using the received vectors of signals.

The electronics system may be configured to obtain spatial information for the user terminals of the communications system by performing uplink beamforming, and the electronics system may be configured to obtain spatial information for the transceivers of the independent communications system using blind spatial channel estimation.

The electronics system may be configured to generate estimates of an array covariance matrix using the signals transmitted by the user terminals of the communications system and the signals transmitted by the transceivers of an independent communications system.

The electronics system may be configured to obtain estimates of spatial signatures of the user terminals of the communications system using a preamble or pilot signal reference.

The electronics system may be configured to generate estimates of the array covariance matrix by estimating a covariance matrix for the transceivers of the independent communications system, estimating a covariance matrix for the user terminals of the communications system, and deriving a composite covariance matrix by combining the covariance matrix for the transceivers of the independent communications system with the covariance matrix for the user terminals of the communications system.

The electronics system may be further configured to transform a frequency of the covariance matrix for the transceivers of the independent communications system to a frequency of the communications system.

The electronics system may be configured to generate a set of pseudo uplink beamforming weights by combining the estimates of the spatial signatures of user terminals of the communications system with the composite covariance matrix, and the electronics system may be further configured to transmit the downlink communications signal using the pseudo uplink beamforming weights transmitting weights.

The electronics system may be configured to obtain spatial signatures for the user terminals of the communications system and/or the transceivers of the independent communications system using an angle of arrival estimation algorithm.

The electronics system may be configured to estimate angle of arrival information of the signals from the transceivers of the independent communications system using a maximum likelihood angle of arrival estimation algorithm, and to generate spatial signatures of the transceivers of the independent communications system using the angle of arrival information. The communications system may be configured to communicate with user terminals using a time division duplex communications protocol.

The electronics system may be configured to generate estimates of a covariance matrix using the signals transmitted by the transceivers of an independent communications system and to decompose the covariance matrix to obtain the principal eigenvector of the covariance matrix or the K eigenvectors corresponding to the K largest eigenvalues, where K represents the number of transceivers of the independent communications system.

The antenna array may be configured to receive pilot or carrier signals transmitted by the transceivers of the independent communications system.

The antenna array may be configured to receive beacon signals transmitted by the transceivers of the independent communications system. The electronics system may be configured to form an uplink antenna pattern using the complex transmitting weights, to receive the beacon signals using the uplink antenna pattern, and to measure strength of the beacon signals received using the uplink antenna pattern, the strength of the beacon signals received using the uplink antenna pattern provides an error signal associated with the complex transmitting weights. The electronics system may be configured to adjust the complex transmitting weights to reduce the strength of the beacon signals.

The antenna array may include a vertical uniform linear array of radiating elements, and the electronics system may be configured to generate complex transmitting weights that form spatial nulls directed at angles of arrival associated with the transceivers of the independent communications system.

The antenna array may include a phased array antenna, and the electronics system may be configured to generate complex transmitting weights that form spatial nulls directed at azimuth/elevation coordinates associated with the transceivers of the independent communications system.

A base transceiver system of a communication system according to some embodiments of the invention includes an antenna array configured to receive vectors of signals including signals transmitted by user terminals of the communications system and signals transmitted by a transceiver of an independent communications system, and an electronics system coupled to the antenna array. The electronics system is configured to obtain location information for a transceiver of the independent communications system, to generate complex transmitting weights for the antenna array that form a spatial null directed at the transceiver of the independent communications system, and to transmit a downlink communications signal over the adaptive antenna system to the user terminal using the complex transmitting weights.

The adaptive antenna may include a plurality of vertical uniform linear array antennas, and the electronics system may be configured to generate complex transmitting weights that form a spatial null directed at an elevation associated with the transceiver of the independent communications system.

The antenna array may be configured to receiving a beacon signal from the transceiver of the independent communications system. The beacon signal may include an unmodulated carrier signal, a control channel signal and/or a traffic channel signal.

The electronics system may be configured to form an uplink antenna pattern using the complex transmitting weights, receive the beacon signal using the uplink antenna pattern, and to measure strength of the beacon signal received using the uplink antenna pattern, the strength of the beacon signal received using the uplink antenna pattern provides an error signal associated with the complex transmitting weights. The electronics system may be configured to adjust the complex transmitting weights to reduce the strength of the beacon signals.

The antenna array may be configured to transmit the downlink communications signal may include transmitting a signal that is Left Hand Circularly Polarized (LHCP), Right Hand Circularly Polarized (RHCP), or Linearly Polarized (LP).

A communications system according to some embodiments of the invention includes user terminals configured to generate communication signals in a first frequency band, and a base transceiver system configured as described above including an antenna array configured to receive vectors of signals including signals transmitted by the user terminals in the first frequency band and signals transmitted by transceivers of an independent communications system in a second frequency band and an electronics system coupled to the antenna array.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings.

DETAILED DESCRIPTION OF EMBODIMENTS OF THE INVENTION

Figure 1:
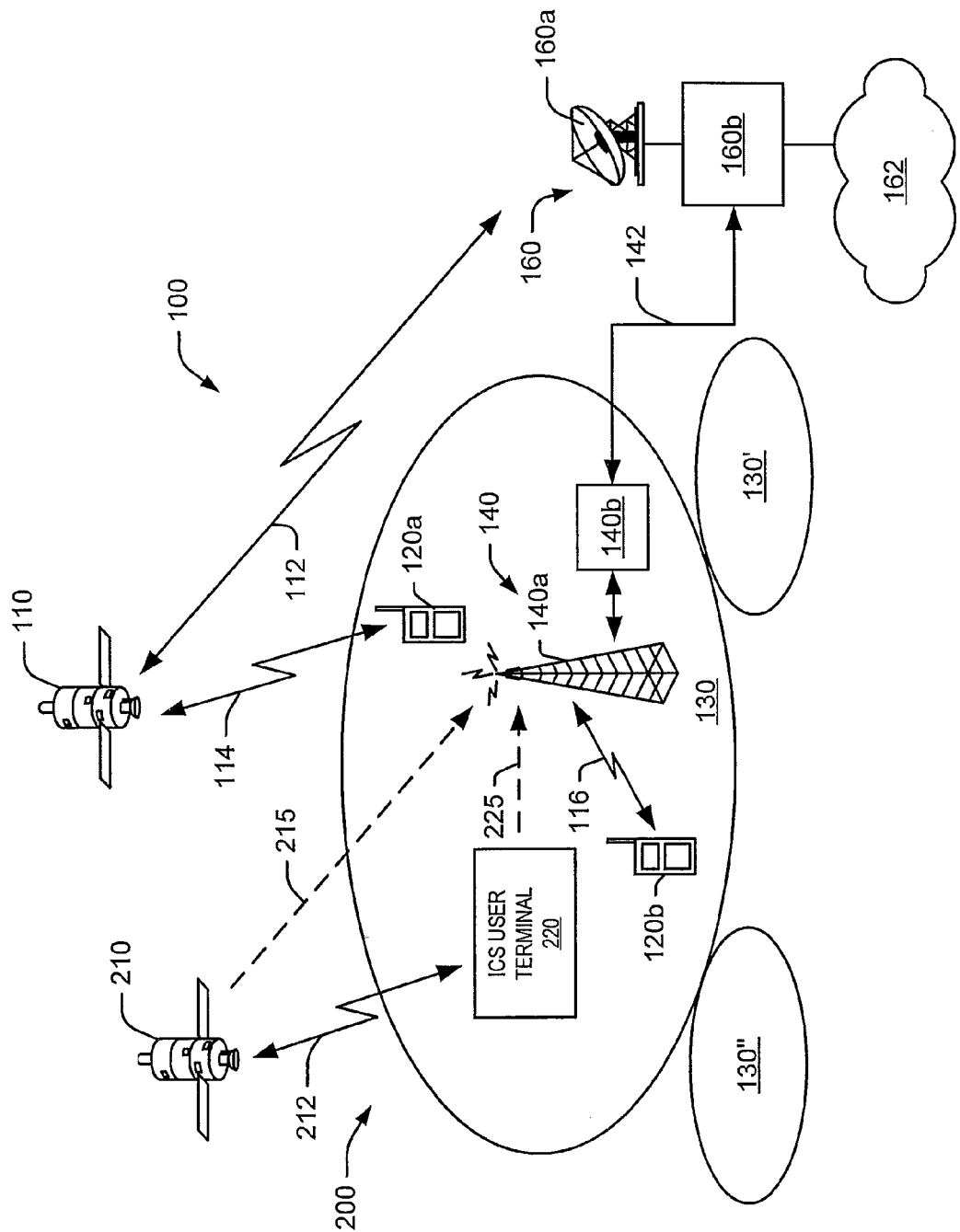
FIG. 1 is a schematic diagram of a cellular satellite communications system and methods according to embodiments of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

As will be appreciated by one of skill in the art, the present invention may be embodied as a method, data processing system, and/or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer usable program code embodied in the medium. Any suitable computer readable medium may be utilized including hard disks, CD ROMs, optical storage devices, a transmission media such as those supporting the Internet or an intranet, or magnetic storage devices.

The present invention is described below with reference to flowchart illustrations and/or block diagrams of methods, systems and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Some embodiments of the present invention may arise from realization that a transceiver of an Independent Communications System (ICS), such as, for example, a satellite or user terminal of a satellite communications systems, may operate in an adjacent (or proximate) frequency band to a frequency band used by one or more Terrestrial Cellular Systems (TCS). For example, a user device of an ICS may be physically proximate to (e.g., within a cell of) the TCS, and/or a satellite of an ICS may be located at an azimuth/elevation relative to a Base Transceiver System (BTS) of the TCS such that emissions of the BTS may be received by the satellite. As such, the ICS transceiver may be subjected to overload/inter-modulation interference from a transmitter of the TCS. A desire to reduce or avoid interference, such as, for example, inter-modulation and/or overload interference, from a TCS transmitter (e.g., base transceiver system) to an ICS transceiver, may be used to impose an additional constraint to adaptive beam forming that may be used by the TCS transmitter.

In some embodiments of the present invention, systems and methods are provided that may reduce or minimize inter-system interference from a Terrestrial Cellular System (TCS) to an Independent Communications System (ICS) that may be operating in a frequency band that is proximate to a frequency band used by the TCS. The technique also may reduce or minimize the intra-system interference. A Base Transceiver System (BS) of the TCS may be configured with an adaptive antenna array to thereby receive vectors of ICS and TCS signals, respectively. Estimates of array covariance matrices may be derived from the received vectors of an ICS signal(s) and TCS signal(s), respectively. An estimate of an ICS covariance matrix (or spatial signature) may be transformed to the TCS frequency band. The frequency transformed ICS covariance matrix or spatial signature, along with the TCS covariance matrix or a spatial signature, may be exploited to form a composite covariance matrix or spatial signature matrix that contains spatial information associated with both TCS user terminals and ICS transceivers. With an a priori known preamble and/or pilot signal for each of the TCS user terminals and the composite TCS/ICS covariance or spatial signature matrix from uplink processing of received signals, an adaptive beam-former may determine optimum transmitting weights that may be used to form a beam that substantially reduces or minimizes intra-system interference among the TCS user terminals while substantially forming a "null" toward the ICS. By using the composite covariance matrix, the adaptive beamformer introduces spatial information relative to ICS transceivers, including for example, ICS user terminals and/or ICS satellites, as an additional constraint on top of intra-system multi-user spatial constraints when forming a beam on a downlink.

FIG. 1 is a schematic diagram of cellular satellite communications systems and methods according to embodiments of the invention. As shown in FIG. 1, these cellular satellite communications systems and methods 100 include a Space-Based Component (SBC) 110, such as one or more geostationary or non-geostationary orbiting satellites. The space-based component 110 may be configured to selectively use/reuse geographically a set of frequencies and to transmit wireless communications signals via a communication link 114 to a plurality of wireless terminals, only one of which is illustrated in FIG. 1 (terminal 120a), in a satellite footprint including one or more satellite cells 130-130", over one or more satellite forward service link (downlink) frequencies $f_D$. The space-based component 110 may also be configured to receive wireless communications from a plurality of wireless terminals, such as wireless terminal 120a in the satellite cell 130, over one or more satellite return service link (uplink) frequencies $f_U$.

A cellular satellite communications system 100 may include a terrestrial communications system (TCS) including at least one Base Transceiver System (BTS) 140, which may include an antenna 140a and an electronics system 140b. The BTS 140 is configured to receive wireless communications signals from, for example, at least one wireless terminal 120b via a communication link 116. In some embodiments, the TCS is an ancillary terrestrial network (ATN) of the cellular satellite communications system 100 that uses/reuses satellite frequencies terrestrially. A cellular satellite communications system may provide users with increased mobility/functionality and/or may provide increased frequency reuse. However, it will be appreciated that embodiments of the invention can be used to decrease inter-system interference and/or intra-system interference in systems that are terrestrial only, space-based only, and/or include combinations of terrestrial and space-based components.

As noted above, a user terminal 120a of the cellular satellite communications system 100 may communicate with the SBC 110 using an uplink frequency $f_U$ within the satellite frequency band. In order to provide increased frequency utilization in a cellular satellite communications system 100, a user terminal 120b of the cellular satellite communications system 100 may communicate with the terrestrial BTS 140 using an uplink frequency $f'_U$ within the satellite frequency band. The frequency $f'_U$ may be the same as an uplink or downlink frequency used for communicating with the space-based component (SBC) 110 in the satellite cell 130 in which the wireless terminal 120b is located and/or in an adjacent or remotely-located satellite cell 130. Thus, as illustrated in FIG. 1, the wireless terminal 120a may be communicating with the space-based component 110 using a frequency in the satellite frequency band while the wireless terminal 120b may be communicating with the ancillary terrestrial component 140, also using a frequency in the satellite frequency band. The space-based component 110 may also undesirably receive a component of the wireless communications from the wireless terminal 120b and/or the BTS 140 in the satellite cell 130 as interference. In addition, the space based component 110 may receive, as interference, a component of wireless communications from a wireless terminal and/or BTS (not shown) located in a different satellite cell over a satellite frequency that may be the same as (and/or overlapping with) $f_U$ and/or $f'_U$.

This interference may generally be strongest when the transmitted signal uses the same carrier frequency as the cell in question (e.g., $f'_U = f_U$), because, in that case, the same return link frequency would be used for space-based component and ancillary terrestrial component communications and, if used over the same satellite cell, no substantial spatial discrimination between satellite cells would appear to exist to reduce a level of interference. Even with spatial separation, however, interference may impair the signal from the first wireless terminal 120a.

Still referring to FIG. 1, embodiments of satellite communications systems/methods 100 can include at least one satellite gateway 160 that can include an antenna 160a and an electronics system 160b. The satellite gateway 160 may be connected to other networks 162, including terrestrial and/or other wired and/or wireless communications networks such as, for example, a public switched telephone network and/or the Internet. The satellite gateway 160 communicates with the space-based component 110 over a satellite feeder link 112. The satellite gateway 160 may also be configured to communicate with ancillary terrestrial components 140 in the ancillary terrestrial network, generally over a terrestrial link 142.

The satellite gateway 160 may communicate with the BTS 140 via a communications link 142, which may be used to coordinate communications of the BTS 140 and the SBC 110 in order to reduce interference between the ancillary terrestrial network and the SBC 110.

Still referring to FIG. 1, a satellite 210 of an independent communications system (ICS) 200 may also communicate via a communications link 212 with an ICS user terminal 220 of the ICS 200 using an uplink and/or downlink frequency that is the same as, adjacent to or overlapping with a frequency used by the BTS 140. The satellite 210 may be part of a separate satellite communications system (i.e. one that is not under common control and/or coordination with the cellular satellite communications system 100). Accordingly, the use of satellite frequencies may not be coordinated between the external satellite 210 and the BTS 140. For example, the external satellite 210 may be a satellite in the existing Inmarsat satellite communications system, which includes eleven geostationary communications satellites, and the ICS user terminal 220 may include, for example, a fixed or mobile satellite terminal.

For a BTS operating in time division duplex (TDD) mode, it may be desirable to require that an antenna of the BTS that transmits using a frequency used by an ICS should provide at least 20 dB of "aggregate" discrimination relative to its bore-sight EIRP (Effective Isotropically Radiated Power) at and above the horizontal plane of the antenna. In fact, such requirements have been implemented by regulation with respect to ICS uplink frequencies used by a BTS. That is, under certain regulatory provisions, the power radiated by the BTS antenna at and above the horizontal plane of the antenna in the direction of an ICS satellite must be at least 20 dB lower than the EIRP of the maximum signal transmitted by the antenna. EIRP refers to the amount of power that would have to be emitted by an isotropic antenna (i.e., one that evenly distributes power in all directions) to produce the peak power density observed in the direction of maximum antenna gain. The aggregate discrimination may come from true antenna gain discrimination and/or signal blockage due to terrain/buildings.

Furthermore, it may be desirable to reduce the EIRP in a direction of an ICS user terminal 220 in order to reduce or avoid interference, such as intermodulation and/or overload interference at the ICS user terminal 220 from a transmitter (such as a BTS) in the TCS.

Some embodiments of the invention may improve true antenna discrimination (as opposed to discrimination provided by terrain/building blockage) by using an adaptive antenna system (AAS) at a BTS. By exploiting the spatial properties of the communications signals of an ICS satellite communications system and BTS end user signals, an adaptive antenna system according to some embodiments of the invention may adaptively form spatial "null(s)" directed toward ICS satellite(s) and/or ICS user terminals, while forming a beam toward a desired end user of the TCS. The term "null" or "spatial null" is used herein in a general sense to refer to directions/areas of reduced signal strength response, and may correspond to, but does not necessarily indicate, a zero or minimum signal strength response at a particular direction. The performance of an adaptive antenna system according to some embodiments of the invention has been evaluated through simulations under various scenarios. The simulation results show that providing an adaptive antenna system at a BTS may provide more than 20 dB of true antenna discrimination irrespective of any signal blockage due to buildings or terrain.

Some embodiments of the invention may arise from realization that for a BTS utilizing a time division duplex (TDD) multiple access scheme, the BTS may transmit a downlink signal using the same frequency band as the one used by the external satellite uplink, such as an ICS uplink. Although only sidelobes of the ICS transceivers may pick up BTS interference, the aggregate interference from a large number of BTSs may still cause an interference problem at the ICS transceiver, e.g. on the uplink of the external satellite. To alleviate this problem, it may be desirable for any BTS antenna transmitting on an uplink frequency of the external satellite to provide at least 20 dB of "aggregate" discrimination (relative to its bore-sight EIRP) at the horizontal plane and above the horizontal plane, from which the external satellite(s) may pick up BTS interference. While possible terrain/building blockage may provide some cushion for the required antenna discrimination, it is difficult to anticipate the effectiveness of such blockage. An antenna array system for a BTS according to some embodiments of the invention may reduce and/or minimize inter-system interference from the BTS to ICS transceivers that may be operating in the same frequency band as the one used by the terrestrial BTS, regardless of the presence or absence of terrain/building blockage.

Adaptive antenna array processing is a technique that may be used to exploit the spatial dimension by adaptively forming a maximum, near maximum, or relatively high power beam (antenna pattern) toward a desired user, and nulls toward other unintended users or systems, such as ICS transceivers. Many algorithms have appeared in the literature for beamforming and estimating signal parameters based on measurements of outputs of an antenna sensor array. Spatial filtering techniques represent early approaches to performing space-time processing of data at the output of an antenna array. Conventional beamformer and Capon's methods are examples of spatial filtering techniques. A conventional beam-former is a spatial filter matched to an impinging signal. Capon's beam-former attempts to reduce or minimize the power received from the noise and any signal coming from directions other than the direction of interest, while maintaining a fixed gain in the direction of interest. This method may be useful in situations where information about the statistical properties of data is not available.

Adaptive beam-forming algorithms can be generally classified into two categories: 1) training or decision-directed adaptive algorithms, and 2) blind adaptive algorithms. Depending on a performance criterion, different beamforming techniques lead to different adaptive algorithms. Typically, beam-forming techniques based on Minimum Mean Squared Error (MMSE) or Least Squares (LS) criteria lead to the Least Mean Squares (LMS) and the Recursive Least Squares (RLS) adaptive algorithms. The MMSE or LS algorithms require a reference signal for the desired user, which could be based either on a training sequence or on decisions about received symbols. The beamforming techniques based on Linear Constrained Minimum Variance (LCMV) and Maximum Signal-to-Noise Ratio (MSNR) criteria do not require a reference signal to determine optimal weight(s). See, e.g., B. D. Van Veen and K. M. Buckley, "Beamforming: A Versatile Approach to Spatial Filtering," IEEE Acoustics, Speech, and Signal Processing Magazine, April 1988. However, both techniques need to have knowledge of the Angle of Arrival (AOA) of the desired signal. High-resolution AOA estimation algorithms are typically based on model-based parametric approaches. These algorithms assume some knowledge about the statistical properties of the data (such as second order ergodicity).

Another model-based approach is the Maximum Likelihood (ML) method. The ML method estimates are those values of the unknown parameters that maximize a likelihood function. Two different ML approaches may be used, namely, deterministic and stochastic, depending on the model assumption regarding the signal waveform. The unknown, deterministic signal model (which is the case for mobile communications) leads to the deterministic ML method, while the Gaussian random signal model results in the stochastic ML method. Although the ML approaches may provide optimal solutions to the antenna array problem, these techniques are often exceedingly complex. For the case of spatially white noise, subspace-based techniques may provide high resolution and/or computationally efficient algorithms. These algorithms may include the Multiple Signal Classification (MUSIC), Estimation of Signal Parameters via Rotational Invariance Techniques (ESPRIT) as well as root-MUSIC for a uniform linear array. The subspace-based techniques also lead to the subspace-based ML approximation approaches, such as efficient Method Of Direction Estimation (MODE). Some of these high resolution AOA estimation techniques, and/or other beamforming techniques, may be used in embodiments of the invention.

In general, the receive (uplink) beamforming and transmit (downlink) beamforming may be quite different for a BTS, depending on the type of system under consideration. Much of beamforming work has been done in the uplink because the knowledge of the wireless channel condition can be easily and robustly estimated. A spatial processing algorithm for a transmitter (such as, for example, a base station transmitter) may be more challenging, since downlink transmission occurs without explicit knowledge of the wireless channel condition(s).

For a Time Division Duplex (TDD) system, as long as the time duplex distance (that is, the temporal separation between transmit and receive time slots) is smaller than the channel coherence time, the uplink channel state typically provides a valid estimate of the downlink channel state, and knowledge of the uplink channel conditions may be used to substantially optimize the downlink transmission. In a Frequency Division Duplex (FDD) system, because the frequency duplex distance (that is, the frequency separation between the uplink channel and the downlink channel) is usually much larger than a channel coherence bandwidth, uplink information may not be useable for downlink beamforming. Moreover, the separation between uplink and downlink carrier frequencies may lead to different antenna spacing in terms of wavelengths for both links even though the same physical antenna array may be used. Consequently, steering vectors in the uplink and downlink may not be the same. Open-loop or closed-loop calibration may be required to derive downlink parameters from measurements of uplink vector channel information in such cases.

According to some embodiments of the invention, systems and methods are provided that may reduce or minimize inter-system interference from a terrestrial BTS (which may or may not be part of an ancillary terrestrial network of a terrestrial/satellite communications system) to an independent communications system (such as Inmarsat satellites) that may be operating in a frequency band that is the same as or proximate to the frequency band used by the terrestrial BTS. Techniques according to some embodiments of the invention may also reduce and/or minimize intra-system interference. A terrestrial BTS may include an adaptive antenna array configured to receive vectors of BTS end user signals and ICS signals, respectively. A vector of signals is a group of related signals, such as signals received over multiple elements of a phased-array antenna. For example, assuming a M-length vector $r_{M,k}$ denotes the received signal vector for the $k^{th}$ signal by an antenna array including M feed elements, the total of K signals received over the M feed element may be collectively denoted as vector $$r_M = \sum_{k=1}^{K} r_{M,k}.$$

For purposes of this discussion, BTS end user terminals will be referred to herein as "ICS user terminals" or "TDD user terminals." For purposes of discussion and analysis, the independent communication system may be assumed to be the Inmarsat satellite communications system. However, it will be recognized that embodiments of the invention may be employed to reduce and/or minimize inter-system interference with any separate communications system.

Estimates of array covariance matrices may be derived from the received vectors of a TDD signal and ICS signals, respectively. The frequency transformed ICS covariance matrix and/or spatial signature/AOA, along with the TDD covariance matrix and/or spatial signature/AOA, may be exploited to form a composite covariance matrix and/or a spatial signature matrix that contains spatial information associated with both ICS user terminals and ICS transceiver(s). With an a priori known preamble/pilot for each of the TCS users and the composite TDD/ICS covariance and/or spatial signature matrix obtained from uplink processing of received signals, an adaptive beam-former may determine optimum transmitting weights to form a beam that substantially reduces and/or minimizes inter-system interference by forming "spatial nulls" toward the ICS transceivers. By using the composite covariance matrix, the adaptive beamformer introduces spatial information of ICS transceivers as an additional constraint on top of the desired TDD spatial constraint when forming a beam on a downlink.

Still referring to FIG. 1, in situations where the satellite 210 is associated with a first system operator and the BTS 140 and TCS terminals 120a, 120b are associated with an unrelated second system operator, the frequencies used by the ICS transceivers to receive and/or transmit communications information may be substantially different than the frequencies used by the BTS 140 and/or the TCS terminals 120a, 120b. As such, receivers associated with the BTS 140, operatively configured to receive and process communications signals transmitted by the TCS terminals 120a, 120b, may not substantially detect transmissions of the ICS transceivers to thereby reduce or minimize a radiation pattern of the antenna system of the BTS 140 (smart antenna) in a direction associated with the ICS transceivers to thereby reduce an overload and/or intermodulation interference at the ICS transceivers. Furthermore, even if a receiver of the BTS 140 is configured to detect a communications transmission of the ICS transceivers, an ICS transceiver, prior to deciding to transmit a communications signal, may experience overload and/or intermodulation interference which may prevent the ICS transceiver from transmitting conventional control channel and/or traffic channel signals. Accordingly, in some embodiments of the invention, an ICS transceiver, such as a satellite 210 and/or an ICS user terminal 220, is configured to transmit a signal (e.g. a "beacon") independent of any overload and/or intermodulation interference condition at the ICS transceiver. The beacon signal may be used by the BTS 140 to obtain angle of arrival ("AOA") and/or channel estimates for the ICS transceiver.

For example, according to some embodiments of the invention, an ICS transceiver such as an ICS user terminal 220 is configured to transmit a beacon signal as soon as the ICS user terminal 220 is activated (turned-on) by a user. In other embodiments, a special switch/button may be provided at the ICS user terminal 220 which, when activated by a user, initiates a transmission of a beacon signal by the ICS user terminal 220. The beacon signal may be a substantially periodic and/or non-periodic signal and it may be radiated by the ICS user terminal 220 at a relatively low power level (e.g., at about 1 watt or less). The bandwidth of the beacon signal may be as narrow as a single sinusoid or wider than a single sinusoid. The beacon signal may represent an un-modulated carrier or a modulated carrier and the frequency of the carrier may be in any frequency band, such as, for example, an L-band, S-band, ISM band, or any other band. The signal may be radiated by the ICS user terminal 220 using a substantially omni-directional antenna and/or any other antenna configuration. The beacon signal need not correspond to a conventional control channel or traffic channel signal. In some embodiments, the beacon signal is radiated by a device that is proximate to the ICS user terminal 220 but may not be attached to the ICS user terminal 220. In some embodiments, the device may be attached or carried by the user of the ICS user terminal 220 and may be activated by the user of the ICS user terminal 220 to transmit the signal when the user desires to communicate, using the ICS user terminal 220, from a location that is served by a TCS and/or that may be susceptible to interference caused by a TCS.

Referring again to FIG. 1, the dotted arrow 225 that is pointed towards the BTS 140 from the ICS user terminal 220 represents the beacon signal that is radiated by the ICS user terminal 220 (or by the device that is proximate to the ICS user terminal 220). Similarly, the dotted arrow 215 that is pointed towards the BTS 140 from the ICS satellite 210 represents the beacon signal that is radiated by the ICS satellite 210. The BTS 140 is configured to detect a measure of the beacon signal(s) 215, 225 and use it as an error quantity for each BTS 140 receiver in forming respective antenna patterns associated with the plurality of active TCS terminals 120A, 120B, thereby allowing each antenna pattern to generate a low gain characteristic (a "null") in a direction associated with the received signal from an ICS transceiver. Since, in accordance with a TDD air interface protocol, a transmit antenna pattern is substantially the same as a corresponding receive antenna pattern (at least over a TDD interval/frame), having configured the BTS 140 to form receive antenna patterns with substantially low gain (nulls) in directions associated with the ICS transceivers, the corresponding transmit antenna patterns of the BTS 140 may also provide low gain (nulls) in the directions associated with the ICS transceivers, thereby reducing an overload and/or intermodulation interference at the ICS transceivers. In some embodiments, the BTS 140 is configured to detect a measure of the beacon signal(s) transmitted by the ICS transceivers and use it as an error quantity for at least one BTS 140 receiver in forming at least one antenna pattern associated with at least one active TCS terminal thereby allowing the at least one antenna pattern to generate a low gain characteristic (a "null") in a direction associated with the received beacon signal(s) 215, 225 from the ICS transceivers.

It will be understood that some embodiments of the present invention that are described herein include ICS transceivers that transmit a beacon signal and allow the BTS 140 to be configured to receive this signal. However, in other embodiments, the BTS 140 may be configured to receive a standard control or traffic channel signal from the ICS transceiver(s) and/or may be configured to determine a location of an ICS transceiver independent of a signal that is transmitted from the ICS transceiver. For example, GPS and/or other techniques may be used by the BTS 140 and/or another infrastructure element, to provide a measure of the location of the ICS transceivers to the BTS 140.

It also will be understood that embodiments of the invention are described herein relative to TDD air interface protocols because in a TDD air interface protocol, a transmit antenna pattern generally is substantially the same as a corresponding receive antenna pattern (at least over a TDD interval/frame). However, embodiments of the invention may also be employed with non-TDD air interfaces, such as frequency division duplex (FDD) air interfaces, wherein the differences between the propagation characteristics and/or other system/component characteristics associated with the differing transmit and receive frequencies and/or with different components associated therewith may be ignored or compensated for, for example by using modeling techniques and/or other measures of these differences.

Furthermore, it will be understood by those having skill in the art that embodiments of the present invention describe the use of "smart" antennas and/or adaptive beam forming to reduce or minimize overload and/or intermodulation interference to an ICS transceiver that is communicating in a TCS service area. In other embodiments of the present invention, however, an BTS 140 that is configured to communicate with one or more TCS terminals by using and/or reusing satellite frequencies, may be provided with a smart antenna to increase or maximize a radiation that is directed to the TCS terminal(s), while minimizing or reducing transmissions that are not directed to the TCS terminal(s) and which may be wasted and/or cause interference to other devices (including other TCS terminals, cellular and/or PCS terminals). Smart antennas also may be used to increase or maximize a gain for signals that are received from TCS terminal(s) while reducing a BTS 140 receiver gain for signals that are not associated with TCS terminals and/or are associated with co-frequency/co-channel TCS terminals.

Finally, it will be understood that a smart antenna or an adaptive antenna may include a linear (one-dimensional) array of antenna elements or a multi-dimensional (e.g., two-dimensional) array of antenna elements and that a smart antenna may, in some embodiments, be configured to radiate signals that are polarized substantially in one polarization sense such as, for example, Left Hand Circularly Polarized (LHCP), Right Hand Circularly Polarized (RHCP), Linearly Polarized (LP) and may be configured to receive signals over at least two polarizations that are substantially in spatial quadrature with each other.

1. System Configuration and Model

Figure 2A:
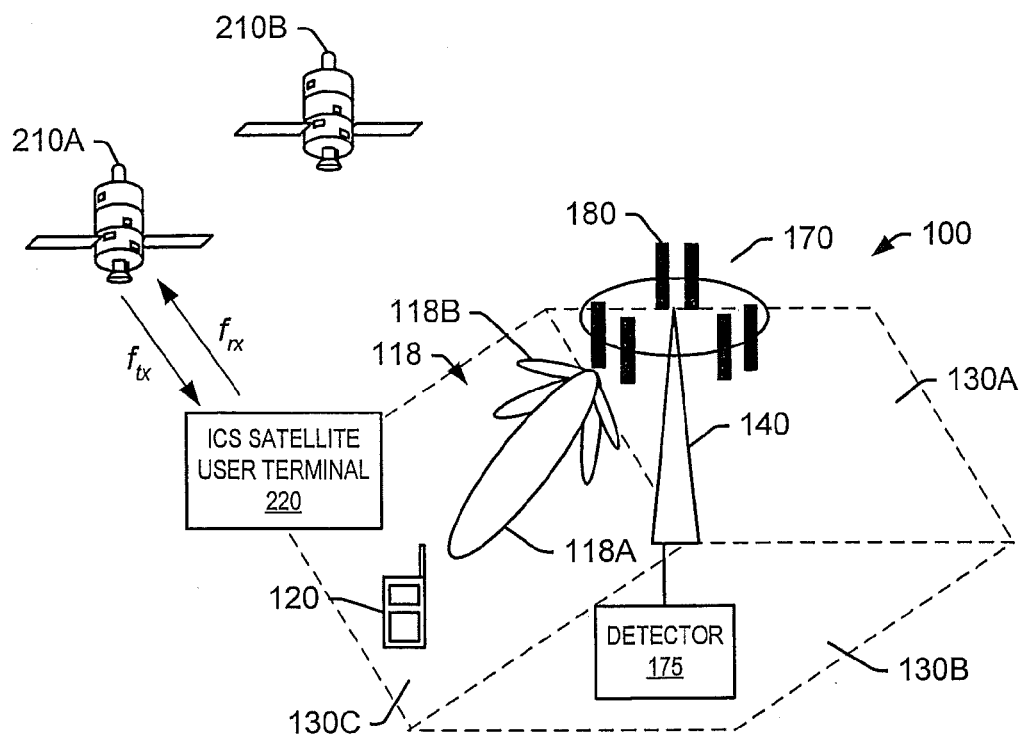
FIG. 2 is a schematic block diagram of an adaptive antenna array system at a base transceiver system (BTS) including 6 Vertical Uniform Linear Arrays.

FIG. 2A is a schematic illustration of a BTS 140 serving a cell 130 of a terrestrial communications system (TCS) 100 which may or may not be an ancillary terrestrial network of a terrestrial/satellite communications system. The cell 130 is divided into three sectors 130A, 130B, 130C. However, the cell 130 may be divided into more or less than three sectors.

Each sector is served by a pair of or more antennas 180. The BTS 140 may communicate on a downlink signal 118 with a TCS user terminal 120 located in a sector 130C of the cell 130. The downlink signal 118 is drawn in FIG. 2A to illustrate a main lobe 118A of the signal 118 directed at the TCS user terminal 120 and sidelobes 118B directed in other directions. Thus, as shown in FIG. 2A, while a beam formed to the TCS user terminal 120 may have a maximum gain in the direction of the TCS user terminal 120, the beam may have sidelobes aimed in other directions.

Also illustrated in FIG. 2A are a pair of satellites 210A, 210B from an independent communications system (ICS) 200, which may be Inmarsat satellites, for example. The ICS satellites 210A, 210B communicate with an ICS user terminal 220. While only two ICS satellites 210A, 210B and a single ICS user terminal 220 are illustrated in FIG. 2A, it will be understood that more or less than two ICS satellites 210A, 210B may be visible from a particular terrestrial location at a given time and/or that more or less than one ICS user terminal 220 may be in or near the cell 130 served by the BTS 140. For purposes of the present discussion, the ICS satellites 210A, 21B and/or the ICS user terminal 220 may be referred to collectively as "ICS transceivers" or individually as an "ICS transceiver."

The ICS satellites 210A, 210B, which may operate in FDD mode, may be on or above the horizontal plane of the antennas 180, and may be receiving at carrier frequency $f_{rx}$ and transmitting at carrier frequency $f_{tx}$, as shown in FIG. 2A. Likewise, the ICS user terminal 220 may be receiving signals from one or more of the ICS satellites at carrier frequency $f_{tx}$ and may be transmitting signals at carrier frequency $f_{rx}$. The terrestrial cellular system (TCS) 100 including the BTS 140 is assumed to be a time division duplex (TDD) system that operates at carrier frequency $f_c$ for both down-link (DL) and uplink (UL) communications. In general, the carrier frequency $f_c$ used by the BTS 140 may not be equal to the transmitting carrier frequency $f_c$ for the ICS system 200. However, the carrier frequency $f_c$ may be equal or approximately equal to the receiving carrier frequency $f_{rx}$ for the ICS 200. Without loss of generality, it may be assumed that $f_{rx}$ is equal to $f_c$. In order to reduce or minimize interference to the ICS satellites 210A, 210B and/or the ICS user terminal 220 from transmissions by the BTS 140, the BTS 140 may obtain knowledge of where the ICS satellites 210A, 210B and the ICS user terminal 220 are located. The BTS 140 may be configured with an antenna array 170 and a detector 175 that is configured to detect the transmit carrier frequency $f_{tx}$ of the ICS satellites 210A, 210B and the transmit carrier frequency $f_{rx}$ (or $f_c$) and, responsive to the detection, to estimate the AOAs and/or spatial signatures of the ICS satellites 210A, 210B and/or the ICS user terminal 220 relative to the orientation of the BTS antenna array 170, even though the BTS 140 may not have any knowledge about the ICS signal other than its transmitting carrier frequency and/or its beacon signal.

Figure 2B:
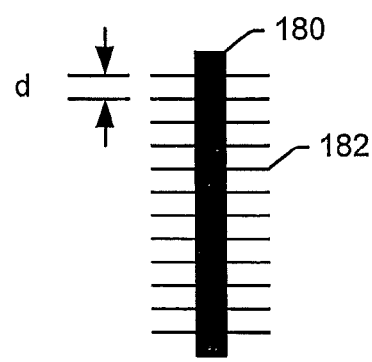

Referring to FIGS. 2A and 2B, the antenna array 170 at the BTS 140 may include 3 sectors of linear arrays. The linear array in each sector may include a number of antennas 180, each of which is a Vertical Uniform Linear Array (VULA) of radiating elements 182. However, other structures, including non-sector circular array with a greater or lesser number of VULAs 180 are also possible. In addition, an antenna in the antenna array 170 may include a phased-array antenna including a two dimensional array of antenna elements capable of forming a beam having both azimuth and elevation components.

FIG. 2A illustrates a BTS having 3 sectors of VULAs 180. Each VULA 180 may include M antenna elements 182 that have adjacent element spacing d. The gain and phase of the antenna elements 182 (with the first element as a reference), are given by a complex-valued steering vector a(θ) as a function of AOA in elevation. For a VULA 180 tuned to the transmit carrier frequency $f_{tx}$, a steering vector may be given by:

$$a_{ICS}^{UL}(\theta) = [1\, e^{j\Omega} \ldots e^{j(M-1)\Omega}]^T$$

where $$\Omega = \frac{2\pi f_{tx}}{c} d\sin(\theta)$$

is a spatial frequency.

If there are K ICS transceivers each transmitting a signal, the array output vector can be expressed as a linear combination of the K incident waveforms and noise as below:

$$y_{ICS}(t) = \sum_{k=0}^{K-1} a_{ICS}^{UL}(\theta_k) s_k(t) + n(t)$$

$$= A_{ICS} s(t) + n(t) \in C^{M \times 1}$$

where $$A_{ICS} = [a_{ICS}^{UL}(\theta_1) a_{ICS}^{UL}(\theta_2) \ldots a_{ICS}^{UL}(\theta_K)]$$

is the array manifold, and $$s(t) = [s_1(t) s_2(t) \ldots s_K(t)]^T$$

is a vector of signal waveforms modeled as deterministic unknowns.

For an array tuned to L TCS user terminals 120 in the terrestrial system, a received array vector may be given by:

$$y_{TDD}(t) = \sum_{p=0}^{L-1} a_{TDD}^{kUL}(\theta_p) s_k(t) + \underline{n}(t)$$

$$= A_{TDD} \underline{s}(t) + \underline{n}(t) \in C^{M \times 1}$$

where $A_{TDD} = [\, a_{TDD}^{UL}(\theta_1) \;\; a_{TDD}^{UL}(\theta_2) \;\; \ldots \;\; a_{TDD}^{UL}(\theta_L)\,]$ and $\underline{s}(t) = [\, s_1(t) \;\; s_2(t) \;\; \ldots \;\; s_L(t)\,]^T$ with:

$$a_{TDD}^{UL}(\theta) = [1 \;\; e^{j\frac{2\pi f_c}{c} d\sin(\theta)} \;\; \ldots \;\; e^{j(M-1)\frac{2\pi f_c}{c} d\sin(\theta)}]^T$$

[Note that for purposes of the present discussion, the subscript "TDD" refers to the TCS user terminals, since the exemplary embodiments involve a BTS operating in TDD mode. However, other communications protocols could be employed.]

In order to perform the AAS operations, the BTS 140 may be configured to:

a) estimate the spatial signature and/or AOA of the ICS satellites 210A, 210B and the ICS user terminal(s) 220;

b) calibrate an antenna array vector channel response difference between receiving and transmitting due to the use of different carrier frequencies for the uplink and downlink by the ICS satellites 210A, 210B and the ICS user terminal(s) 220;

c) form a composite array covariance matrix or composite spatial signature matrix; and d) form a downlink beam based on the composite covariance matrix or spatial signature matrix that includes constraint information from both the TCS user terminals and the ICS transceivers.

2. Description of Exemplary Embodiments

In some embodiments of the invention, a BTS 140 uses an antenna array 170 and detector 175 tuned to the ICS transmitting carrier frequencies $f_{tx}$ to estimate the spatial signatures for the ICS satellites 210A, 210B and/or the tuned to the carrier frequencies $f_{rx}$ to estimate the spatial signatures of the ICS user terminals 220. The spatial signature estimates are used as partial inputs for adaptive downlink (DL) beamforming by the BTS 140. The adaptive DL beam-forming uses the spatial signature estimates for the ICS transceivers along with the information obtained from the adaptive uplink (UL) beamforming for a desired TDD terminal to form a beam that has a peak substantially pointed to the desired mobile terminal and a "spatial null" against the ICS satellite(s) and/or other TCS user terminals. Adaptive UL beam-forming is described in the literature and need not be discussed further herein.

Since the ICS transceivers belong to an independent communications system, the BTS 140 may estimate the spatial signatures of the ICS transceivers by blind spatial channel estimation techniques, because the ICS signals may not be known by the BTS 140. To use the received ICS vector channel estimates of the ICS downlink channel (which has a carrier frequency at $f_{tx}$) or the ICS uplink channel (which has a carrier frequency at $f_{rx}$) in the BTS 140 downlink transmit beamforming process, a calibration/transformation from uplink to downlink may be performed, because the ICS downlink may operate at a different carrier frequency from the uplink. The frequency duplex distance between the uplink and the downlink signals used by the ICS satellites 210A, 210B may result in different steering vectors between uplink and downlink. A linear transformation through rotation of subspaces that provides an estimate of the downlink steering vectors from the uplink vectors may be used. A downlink calibration table of an antenna array is provided as a matrix that contains the downlink steering vector for a set of azimuth directions $\{\theta_1, \theta_2, \ldots, \theta_L\}$ $$A^{DL}=[a_{ICS}{}^{DL}(\theta_1), a_{ICS}{}^{DL}(\theta_2), \ldots, a_{ICS}{}^{DL}(\theta_L)]$$

where $$a_{TDD}^{DL}(\theta) = \left[1 \quad e^{j\frac{2\pi f_c}{c} d\sin(\theta)} \quad \ldots \quad e^{j(M-1)\frac{2\pi f_c}{c} d\sin(\theta)}\right]^T$$

Similarly for the uplink calibration table:

$$A^{UL}=[a_{ICS}{}^{UL}(\theta_1), a_{ICS}{}^{UL}(\theta_2), \ldots, a_{ICS}{}^{UL}(\theta_L)]$$

A transformation problem is to find the best transformation matrix T that minimizes the difference between the array of downlink steering vectors and the transformed array of uplink steering vectors, namely, a transformation matrix T that satisfies the following criterion:

$$\min \|A^{DL}-TA^{UL}\|^2 \text{ subject to } T^H T = I_M$$

With the known calibration table matrices for both downlink and uplink, it can be shown that the optimal orthogonal matrix $T \in C^{M \times M}$ may be given by:

$$T=UV^H$$

where U and V are the left and right singular vectors of $A^{DL}(A^{UL})^H$ by calculating the Singular Value Decomposition (SVD) of $A^{DL}(A^{UL})^H$, i.e., $$A^{DL}(A^{UL})^H = U\Sigma V^H$$

Applying the transformation matrix T to the estimate of a spatial steering vector $\hat{c}_{ICS}{}^{UL}(\theta_k)$, from the uplink, we obtain the steering vector estimate of the satellites for the downlink as follows:

$$\hat{c}_{ICS}{}^{DL}(\theta_k)=T\hat{c}_{ICS}{}^{UL}(\theta_k), k=1,\ldots,K$$

The steering vector estimates for the ICS user terminals 220 may or may not need to be transformed.

For a TDD-based TCS 100, the same or a similar transformation technique may be used to compensate a mismatch between multiple receiver chains and multiple transmit chains. An UL calibration table and a corresponding DL calibration may be obtained from the measurements of receive and transmit signals through a calibration unit.

Figure 3:
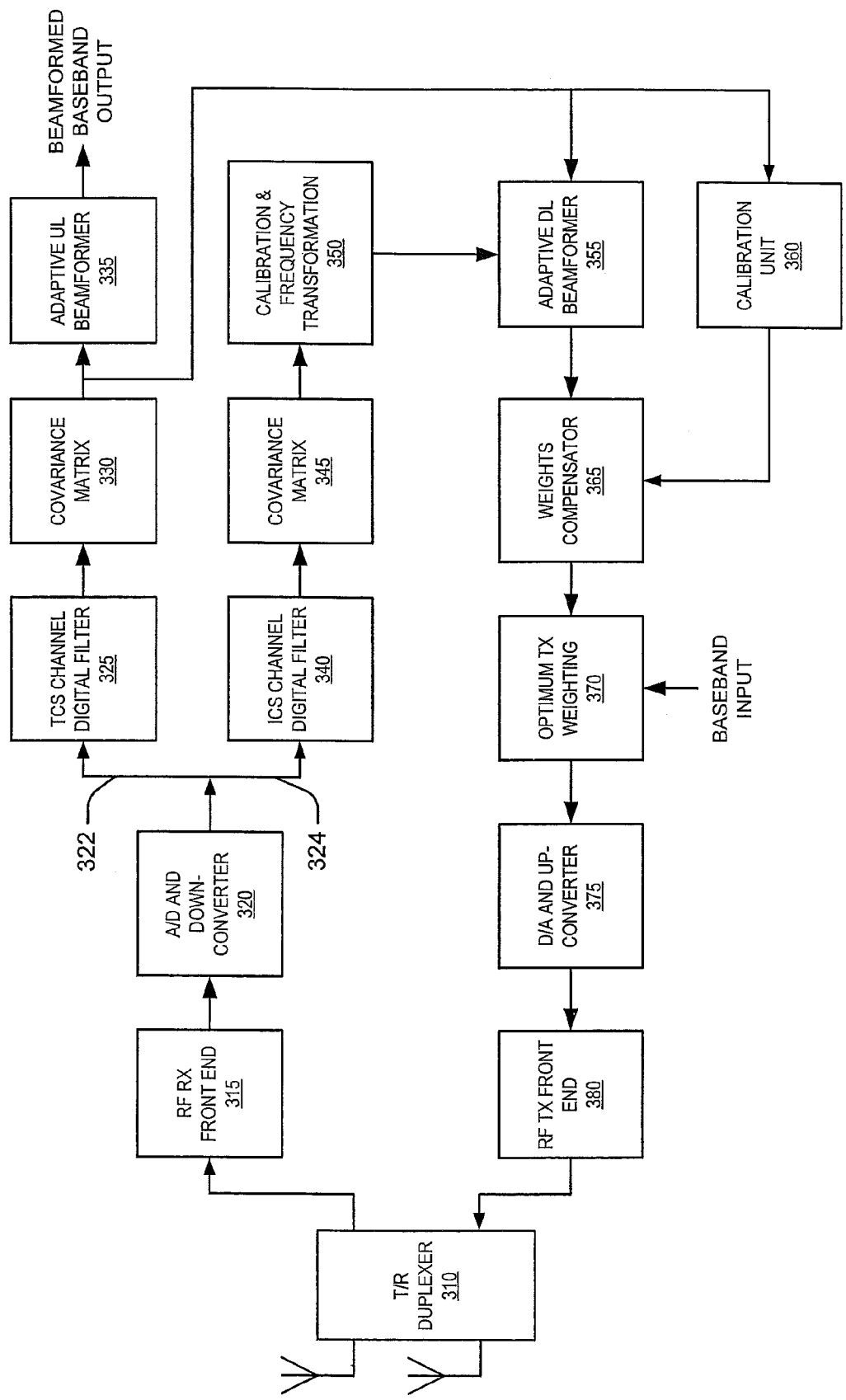
FIG. 3 is a schematic block diagram of an architecture of a BTS with the adaptive antenna array system.

FIG. 3 illustrates, in block diagram form, a base station architecture and associated methods for a BTS 140 according to some embodiments of the invention. A TDD BTS 140 with an adaptive antenna system may adaptively form a DL beam that may increase or maximize the signal-to-interference plus noise ratio for the desired TCS user while forming a "null" toward the ICS transceiver by using the UL received vectors. In the uplink, the TDD BTS 140 may receive both the TCS signals and ICS signals though a single antenna array. Signals received at the antenna array pass through a transmit/receive duplexer (block 310) to an RF receive front end processor (block 315). The received signals are down-converted and sampled by an A/D and downconverter (block 320). The sampled digital signals are then filtered by both a TCS channel digital filter (block 325) along a first processing path 322 and an ICS channel digital filter (block 310) along a second processing path 324.

The TCS signal path 322 and the ICS signal path 324 form respective array vector outputs. From the TCS array vector output and the ICS array vector output, respectively, the TCS array covariance matrix (block 330) and ICS array covariance matrix (block 345) are estimated. The TCS covariance matrix is input to an adaptive UL beamformer (block 335), which generates a beamformed baseband received TCS signal.

Depending on the form of the embodiment, the spatial signatures may be estimated. For the ICS path 324, the covariance matrix may be processed for frequency transformation/calibration (block 350) before it is used with the counterpart from the TCS path 322 for the DL adaptive beamforming by an adaptive DL beamformer (block 355). The weights output by the adaptive beamformer (block 355) are compensated by a weights compensator (block 365) based on the covariance matrix (block 330) that has been processed by a calibration unit (block 360). The calibration unit (block 360) estimates any differential gain and phase introduced by receiver and transmitter hardware mismatch among the multi-antenna paths. The differential gain and phase shifts among the multi-antenna paths are compensated through the weight compensator (block 365).

The compensated weights are applied to the baseband transmit signal (block 370), and the resulting signal is converted to analog and upconverted (block 375). The analog signal is then amplified by a front end transmit processor (block 380) and transmitted through the duplexer (block 310).

Figure 4:
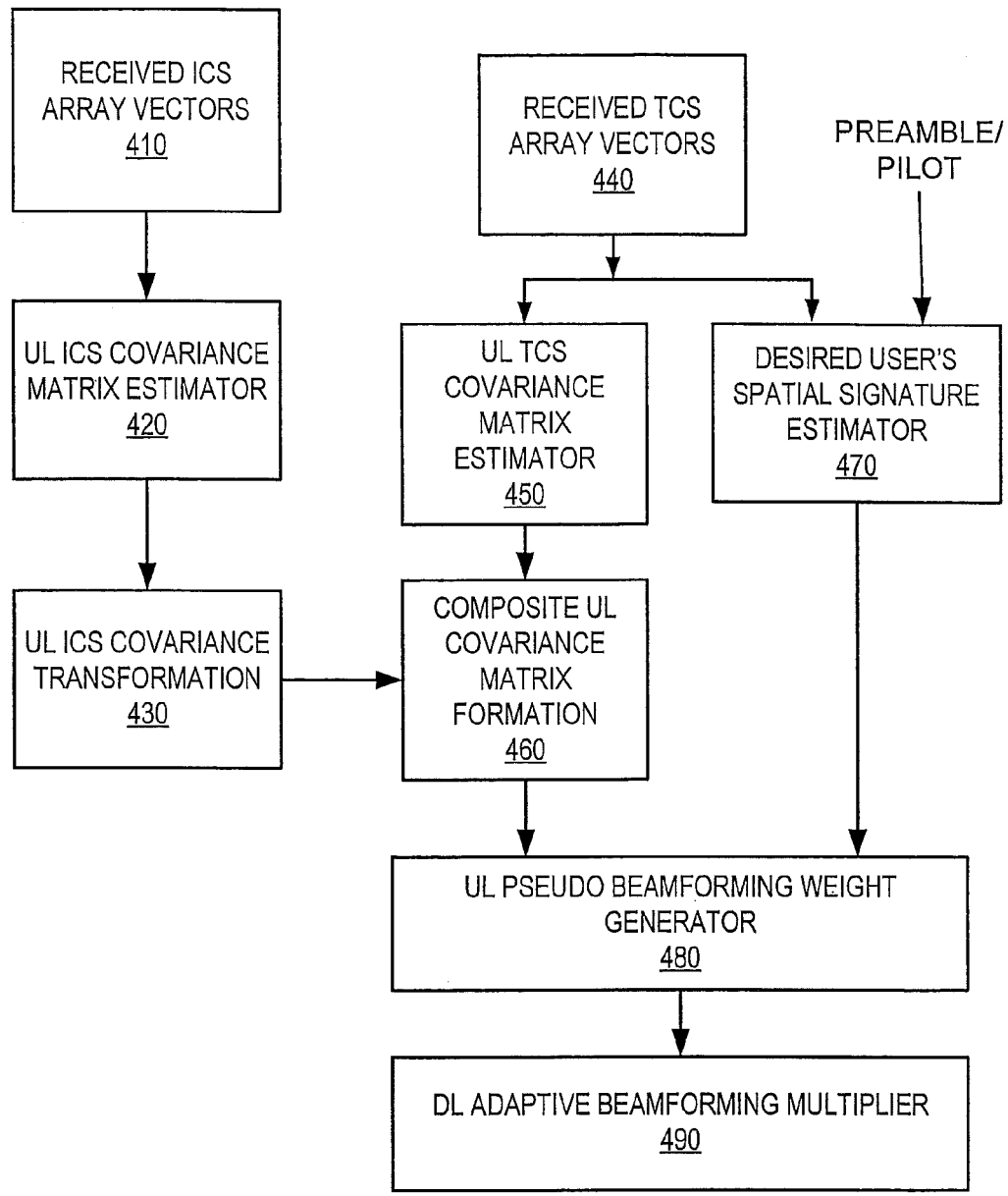
FIG. 4 is a flowchart of an adaptive downlink beamforming algorithm according to some embodiments of the invention.

FIG. 4 shows embodiments of an adaptive downlink beamformer using MMSE and/or LCMV based algorithms. Uplink adaptive beamforming may be accomplished optimally with MMSE and/or LCMV based algorithms without any concern about the ICS signals, since the ICS downlink transmission does not cause interference to the base station. However, if the weights obtained from the uplink beamforming were directly applied to downlink beamforming, there would generally be no guarantee of providing a null in a direction associated with an ICS satellite in the downlink. To create a null in the direction of an ICS satellite in the downlink beamforming, we can create a pseudo uplink beamforming that is constrained by both TCS user terminals and ICS transceivers at the TDD carrier frequency $f_c$, and then apply the pseudo uplink beamforming weights for the downlink beamforming. Specifically, the following procedures, which are referred to as Algorithm I, may be performed:

Step 1: Estimate the uplink covariance matrix for ICS transceivers $\hat{R}_{ICS}$ that is given by:

$$\hat{R}_{ICS}(f_{tx}, \theta) = \frac{1}{N}\sum_{t=1}^{N} y_{ICS}(t)y_{ICS}^H(t)$$

Step 2: Perform frequency transformation for the ICS uplink covariance matrix from the ICS carrier frequency $f_{tx}$ to the TCS carrier frequency $f_c$:

$$\hat{R}_{ICS}(f_c,\theta)=[T\bar{a}(f_{tx},\theta)][T\bar{a}(f_{tx},\theta)]^H = T\hat{R}_{ICS}(f_{tx},\theta)T^H,$$
$$k=1,\ldots,K$$

Step 3: Derive the composite uplink covariance matrix by adding the frequency calibrated ICS uplink covariance matrix to the TCS uplink covariance matrix to get the composite uplink covariance matrix, which yields:

$$\hat{R}(f_c, \theta) = \hat{R}_{TDD}(f_c, \theta) + \hat{R}_{ICS}(f_c, \theta) \text{ where}$$

$$\hat{R}_{TDD}(f_c, \theta) = \frac{1}{N}\sum_{t=1}^{N} y_{TDD}(t)y_{TDD}^H(t)$$

Step 4: Obtain the estimate of the desired user's spatial signature using preamble or pilot reference $r_k$ as:

$$\hat{a}(f_c, \theta_k) = E[yr_k^*] = \frac{1}{N}\sum_{t=1}^{N} y(t)r_k^*(t)$$

Step 5: Determine the weights of pseudo uplink beamforming by:

$$\hat{w}_k = \hat{R}^{-1}(f_c, \theta)\hat{a}(f_c, \theta_k) \text{ or}$$

$$\hat{w}_k = \frac{\hat{R}^{-1}(f_c, \theta)\hat{a}(f_c, \theta_k)}{\hat{a}^H(f_c, \theta_k)\hat{R}^{-1}(f_c, \theta)\hat{a}(f_c, \theta_k)}$$

Step 6: Apply the weights of pseudo uplink beamforming obtained in Step 4 to the downlink transmit beamforming:

$$x_k = \hat{w}_k^* s_k$$

Since the adaptively formed beam is constrained by both intra-system and inter-system constraints, the adaptively formed beam may provide an increased gain toward the desired user while minimizing or reducing the inter-system interference and intra-system interference to the extent allowed by the number of available degrees of freedom.

Figure 5:
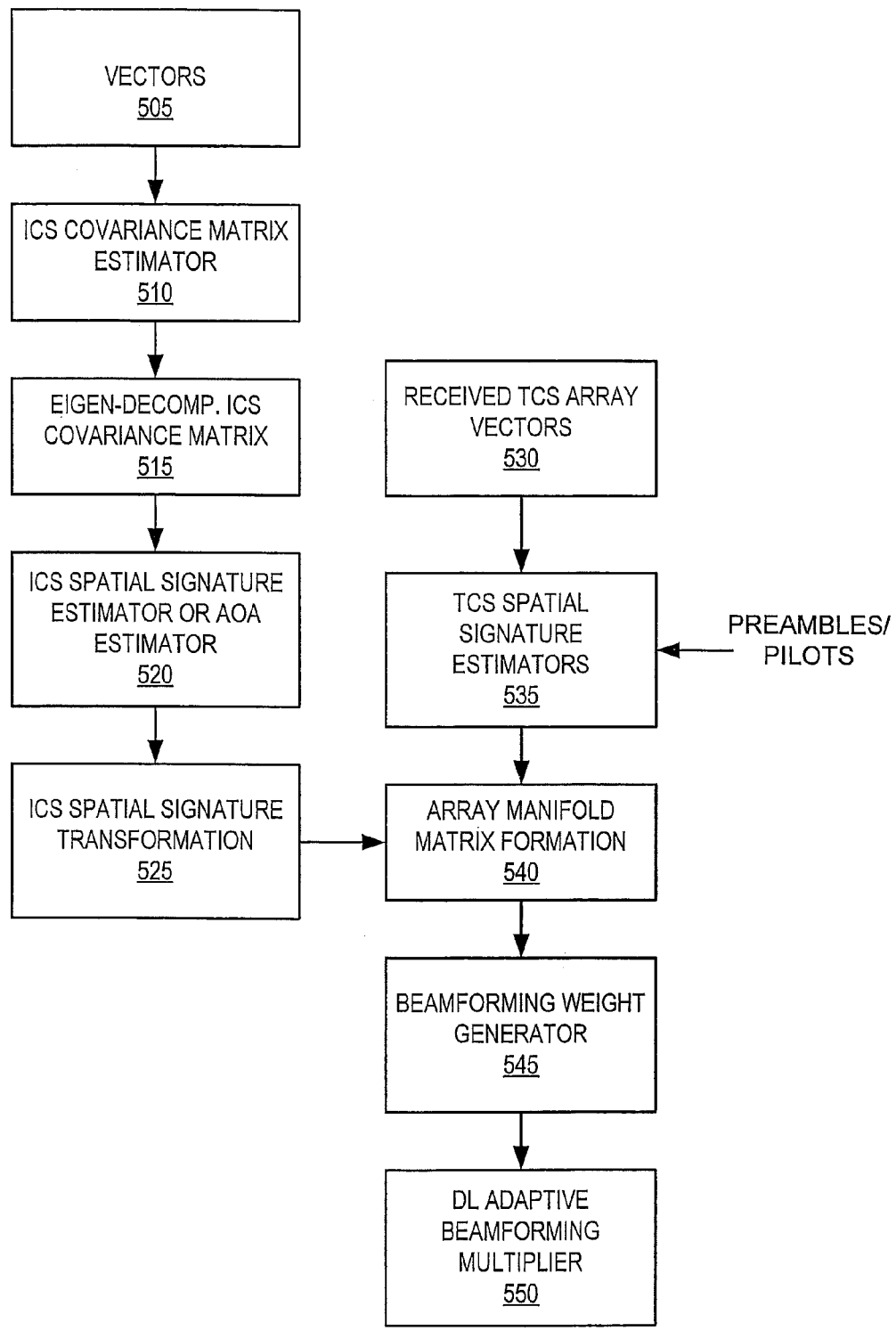
FIG. 5 is a flowchart of an adaptive downlink beamforming algorithm according to further embodiments of the invention.

FIG. 5 illustrates embodiments of an adaptive downlink beam-former using an algorithm according to further embodiments of the invention, referred to herein as Algorithm II. The array covariance matrix is defined by:

$$R = E\{y(t)y^H(t)\} = AR_s A^H + \sigma^2 I$$

where $R_s = E\{s(t)s^H(t)\}$ denotes the source covariance matrix, and $\sigma^2$ is the thermal noise variance. The eigenvectors of the covariance matrix R belong to either of the two orthogonal subspaces—the principal eigen subspace called the signal subspace and the non-principal eigen subspace called the noise subspace. The steering vectors related to AOAs lie in the signal subspace and hence are orthogonal to the noise subspace. Therefore, it is possible to estimate signal steering vectors by performing eigen-decomposition of the array covariance matrix. The estimate of the covariance matrix $\hat{R}$ is given by:

$$\hat{R} = \frac{1}{N}\sum_{t=1}^{N} y(t)y^H(t) = \hat{E}_s\hat{\Lambda}_s\hat{E}_s^H + \hat{E}_n\hat{\Lambda}_n\hat{E}_n^H$$

The eigen-decomposition of $\hat{R}$ results in the representation:

$$\hat{R} = \hat{E}_s\hat{\Lambda}_s\hat{E}_s^H + \hat{E}_n\hat{\Lambda}_n\hat{E}_n^H = \sum_{i=1}^{N}\hat{\lambda}_i\hat{e}_i\hat{e}_i^H,$$

where $\hat{\lambda}_1 > \ldots > \hat{\lambda}_K > \hat{\lambda}_{K+1} = \ldots = \hat{\lambda}_M = \sigma^2$. The matrix $\hat{E}_s = [\hat{e}_1, \ldots, \hat{e}_K]$ contains the K eigenvectors corresponding to the largest eigenvalues. The range space of $\hat{E}_s$ is the signal subspace. Its orthogonal complement is the noise subspace and is spanned by the columns of $\hat{E}_n = [\hat{e}_{K+1}, \ldots, \hat{e}_M]$.

For K ICS satellites with covariance matrix $\hat{R}_{ICS}$, the estimated spatial matched filter (eigen-filter) bank is given by estimates of signal subspace, i.e:

$$[\hat{c}_{ICS}^{UL}(\theta_1), \ldots, \hat{c}_{ICS}^{UL}(\theta_K)] = \hat{E}_s = [\hat{e}_1, \ldots, \hat{e}_K] \epsilon C^{M \times K}$$

By using the transformation matrix T in the estimation of the spatial steering vector $\hat{c}_{ICS}^{UL}(\theta_k)$, from the uplink, the downlink steering vector estimates of the ICS satellites can be obtained by $\hat{c}_{ICS}^{DL}(\theta_k) = T\hat{c}_{ICS}^{UL}(\theta_k)$, $k=1, \ldots, K$. Alternatively, a noise subspace or signal subspace based high-resolution AOA estimation algorithms, such as MUSIC, and MODE, may be used to estimate $\theta_k$. With the estimation of $\theta_k$, the downlink steering vector estimates of the ICS satellites can be obtained by $$\hat{c}_{ICS}^{DL}(\theta_k) = \left[1 \ e^{j\frac{2\pi f_c}{c}d\sin(\theta_k)} \ \ldots \ e^{j(M-1)\frac{2\pi f_c}{c}d\sin(\theta_k)}\right]^T, k=1,\ldots,K$$

The downlink beamforming may be based on the following input information: 1) estimate of the steering vector for the ICS satellites at downlink $\hat{c}_{ICS}^{DL}(\theta_k)$; 2) estimate of spatial signatures (steering vectors) for the desired TCS user $\hat{h}^{DL}(\phi_1)$.

Given that these estimates are available for the downlink beamforming, in the case of single TCS user and K ICS satellites, to form a beam that has unity response in the direction of the desired TCS user, and null response in the directions of the ICS satellites, the desired weight vector is subject to the following constraints:

$$w^H\hat{h}^{DL}(\phi_1) = 1$$

$$w^H\hat{c}_{ICS}^{DL}(\theta_k) = g, k=1,\ldots,K$$

where g is the constraint beam gain toward the ICS transceivers.

By forming a matrix B whose columns are the steering vectors associated with directions of desired TCS user and ICS transceivers:

$$B = [\hat{h}^{DL}(\phi_1), \hat{c}_{ICS}^{DL}(\theta_1), \ldots, \hat{c}_{ICS}^{DL}(\theta_K)] \epsilon C^{M \times (K+1)}$$

We can rewrite the above constraint equations as:

$$w^H B = i_1^T$$

where $i_1 = [1, g, \ldots, g]^T$

To provide an antenna array that has enough degrees of freedom to form K nulls, one may require $K \leq M-1$. A general form of solution for the estimate of the weighting vector may be given by:

$$w^H = i_1^T (B^H B)^{-1} B^H \in C^{1 \times M}$$

where the term $(B^H B)^{-1} B^H$ is the pseudo inverse of matrix B.

In summary, downlink beam-forming based on Algorithm II may include the following steps:

Step 1: Estimate the uplink covariance matrix $\hat{R}_{ICS}$ for the ICS transceivers.
Step 2: Perform eigen-decomposition of $\hat{R}_{ICS}$
Step 3: Obtain the estimates of the spatial signatures for the ICS transceivers from the principal eigenvector or the K eigenvectors corresponding to K largest eigenvalues if K ICS satellites are involved.
Step 4: Perform frequency transformation/calibration by using the transformation matrix to obtain the ICS spatial signature at the TDD frequency band. Alternatively, estimate the AOAs using MUSIC or MODE, and then construct the ICS spatial signature at the TDD frequency band with the AOA information.
Step 5: Estimate the spatial signature for the TCS user terminals by performing correlation between the received TDD array vectors and the preamble/pilot sequence if preamble/pilot is available.
Step 6: Form a matrix B whose columns are filled with the estimated spatial signature vectors associated with directions of the TCS user terminals and the ICS transceivers.
Step 7: Obtain the pseudo-inverse of matrix B, and obtain weights.
Step 8: Apply the weighting vector obtained in Step 7 to the TCS user for the downlink transmit beamforming.

3. Performance Simulations

Simulation models consider the TCS operation in TDD mode where the BTS may be configured with an adaptive antenna array to thereby receive vectors of terrestrial TDD end user signals and ICS satellite signals, respectively. The ICS satellite(s) may operate in FDD mode where the downlink carrier frequency $f_{tx}$ may not overlap the TCS carrier frequency $f_c$. However the ICS uplink carrier frequency $f_{rx}$ may be co-channeled with the TCS carrier frequency $f_c$. The ICS signals may impinge on the BTS antenna array 170 from low elevation angles at the horizontal plane and above the horizontal plane. The ICS signals are assumed to be modulated using QPSK modulation. The vertical uniform linear antenna array (VULA) 180 includes M antenna elements 182 with a half-wave length spacing between adjacent elements. The simulation models assume the following key system parameters

| | |
|---|---|
| TCS mode | TDD |
| BTS carrier frequency $f_c$ | 1634.5 MHz |
| ICS downlink frequency $f_{tx}$ | 1549.85 MHz |
| ICS uplink frequency $f_{rx}$ | 1634.5 MHz |
| ICS signal modulation | QPSK |
| Number of antenna elements of VULA | 12 |
| Spacing between two adjacent elements | Half-wavelength (9.18 cm) |
| BTS received ICS SNR | 5 dB |
| AAA beam gain constraint g toward ICS (for Algorithm II) | −20 dB, −28 dB, −34 dB |
| Adaptive beamforming algorithms | 1) Algorithm II with AOA estimation<br>2) Algorithm I |

The BTS AAS receiver is 175 configured to operate in dual bands in parallel. One band is for the ATC carrier frequency $f_c$. The other band is for the ICS downlink frequency $f_{tx}$. To ensure that the BTS 140 receives a reasonable level of ICS signals, the BTS adaptive antenna array 170 is configured to receive the ICS signals at a local ICS downlink frequency $f_{tx}$. The ICS angle-of-arrival (AOA) estimates are obtained using the MUSIC algorithm with 1000 samples of received vector signals at a time.

Figure 6A:
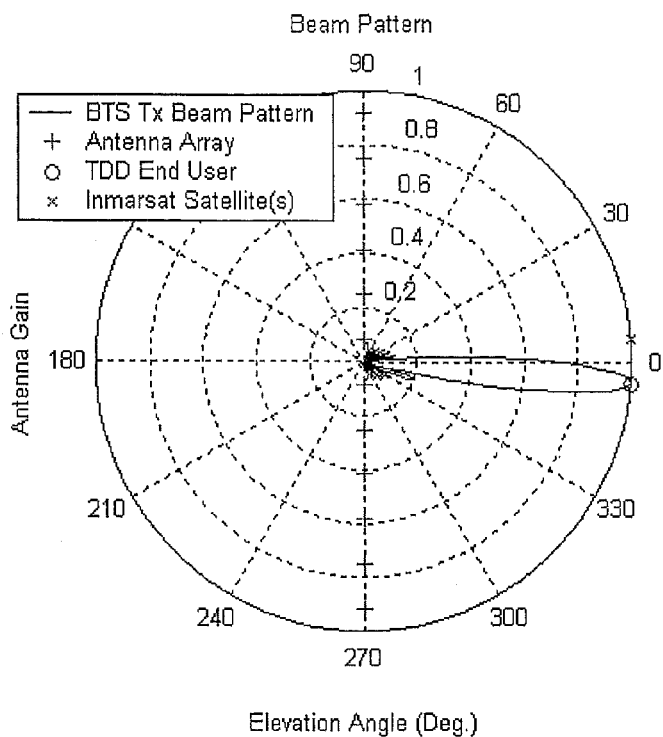
FIG. 6 is a plot of a downlink beam pattern according to some embodiments of the invention when a terrestrial communications system (TCS) user is located at −5° elevation and an ICS satellite is located at 5° elevation (−20 dB constraint for the satellite)
Figure 6B:
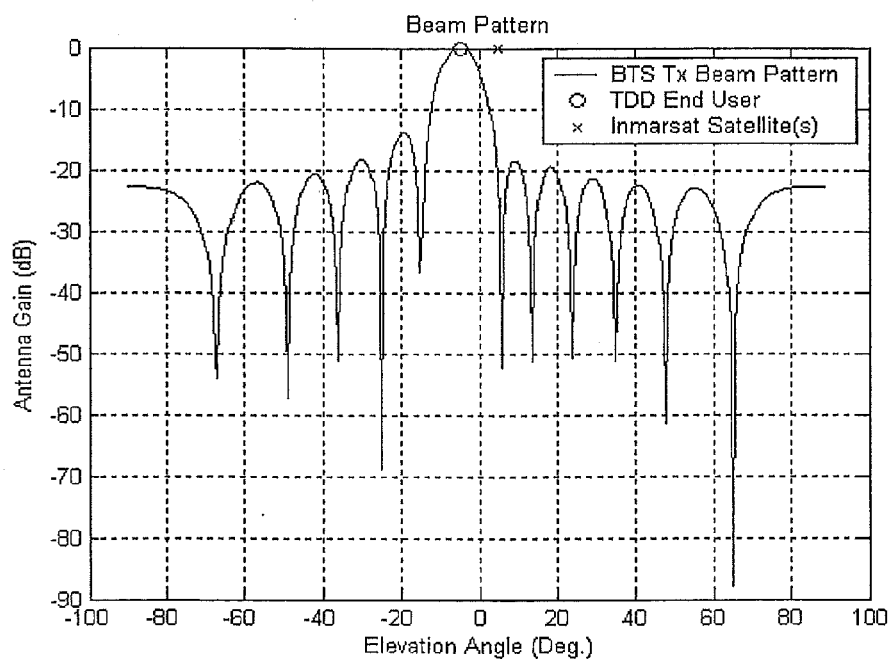

In a first example, one ICS satellite is located at an elevation angle of 5 degrees while the desired TCS user terminal is located at elevation angle of −5 degrees. By processing the received vectors of ICS signals and the TDD end user signals as described in the foregoing section, the BTS adaptive antenna array may adaptively form a maximum, or near maximum beam toward the desired TCS user and a beam that has a radiated power toward the ICS satellite that is −20 dB down from the maximum direction. FIG. 6A shows the simulated downlink transmission beam pattern of the BTS in a polar plot, and FIG. 6B shows the simulated downlink transmission beam pattern in a linear plot.

Figure 7A:
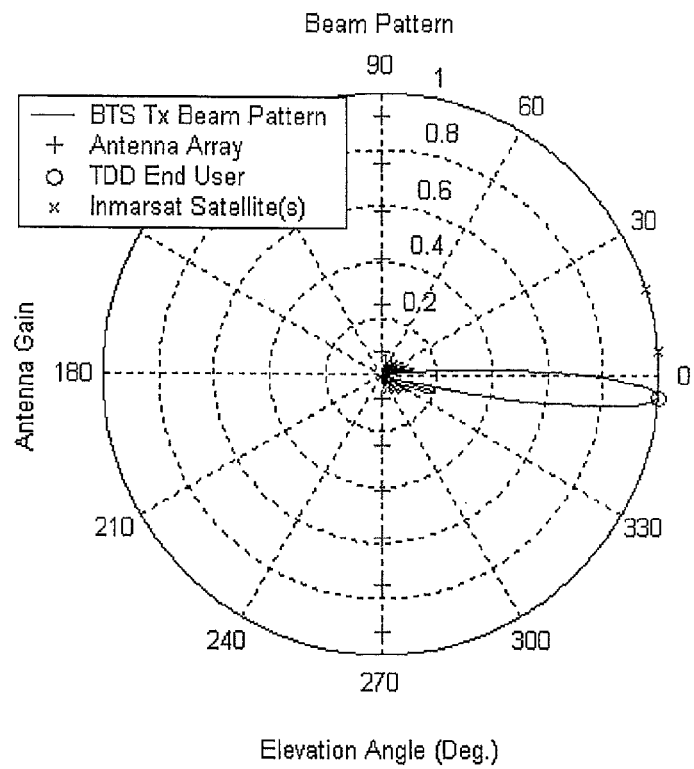
FIG. 7 is a plot of a downlink beam pattern according to some embodiments of the invention when a TCS user is located at −5° elevation and ICS satellites are located at 5 & 18° elevations respectively (−20 dB constraint for the satellites)
Figure 7B:
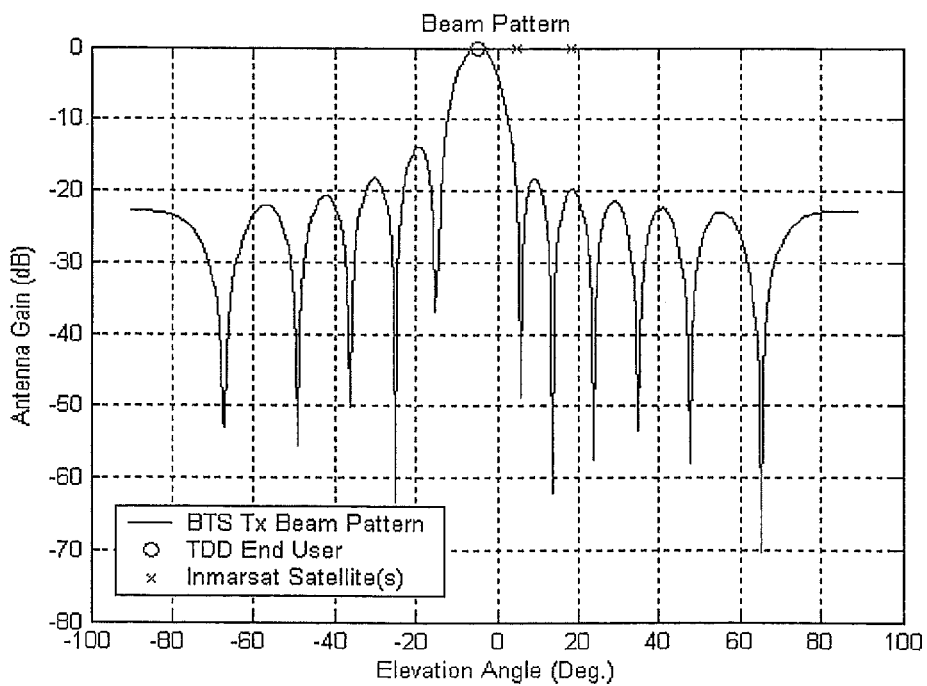

The next example considers two ICS satellites at elevation angle of 5 degrees and 8 degrees and the desired TCS user terminal at elevation angle of −5 degrees. As shown in FIGS. 7A and 7B, the adaptively formed downlink beam pattern has a gain of at least −20 dB toward the satellites and a near maximum gain toward the desired user. For most of the unconstrained region above the horizon, the sidelobes are also well under −20 dB. This is because the constraint gain for the satellites is set to a limited value. The deeper the constraint gain is, the higher the unconstrained sidelobes. Thus there is a trade-off between the depth of nulls and gains of the unconstrained sidelobes.

Figure 8A:
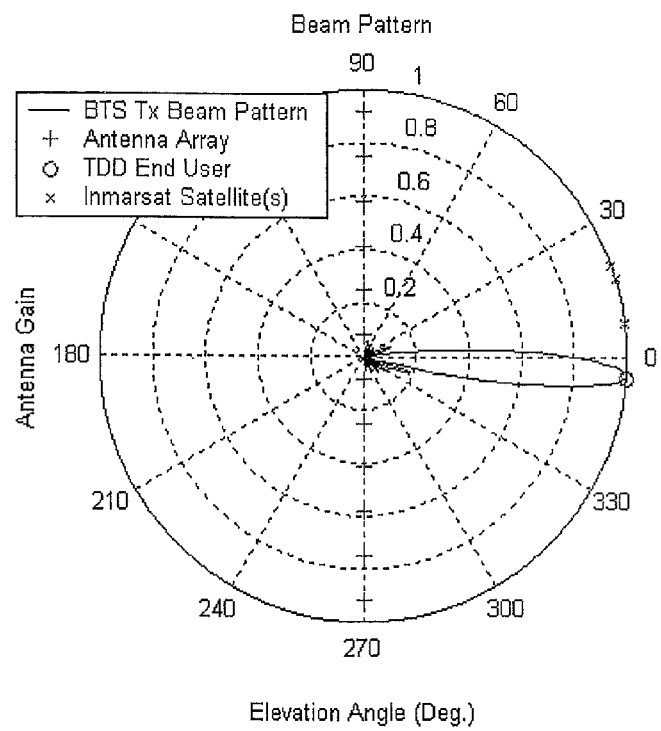
FIG. 8 is a plot of a downlink beam pattern according to some embodiments of the invention when a TCS user is located at −5° elevation and ICS satellites are located at 7, 17 & 20° elevations respectively (−20 dB constraint for the satellites)
Figure 8B:
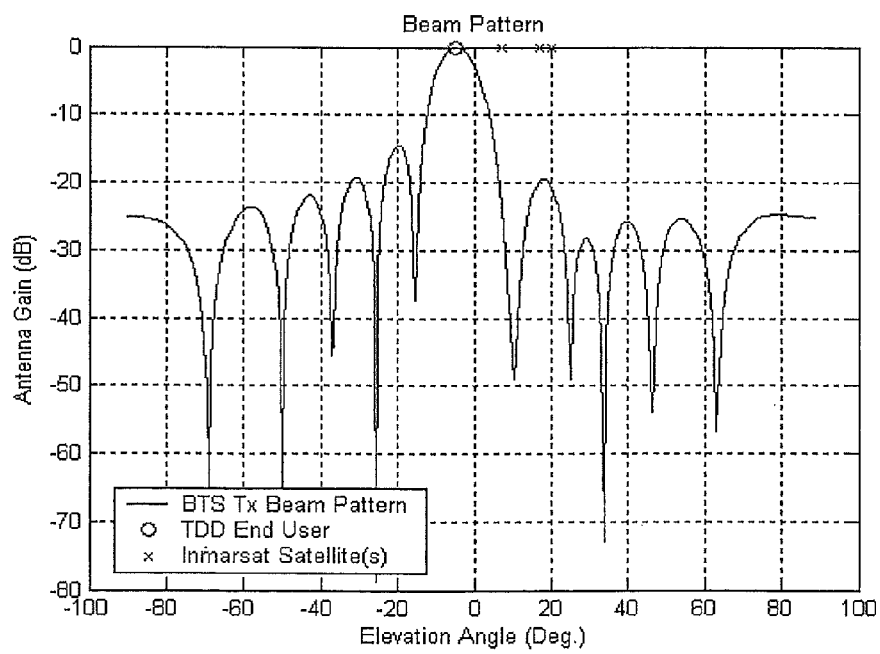
Figure 9A:
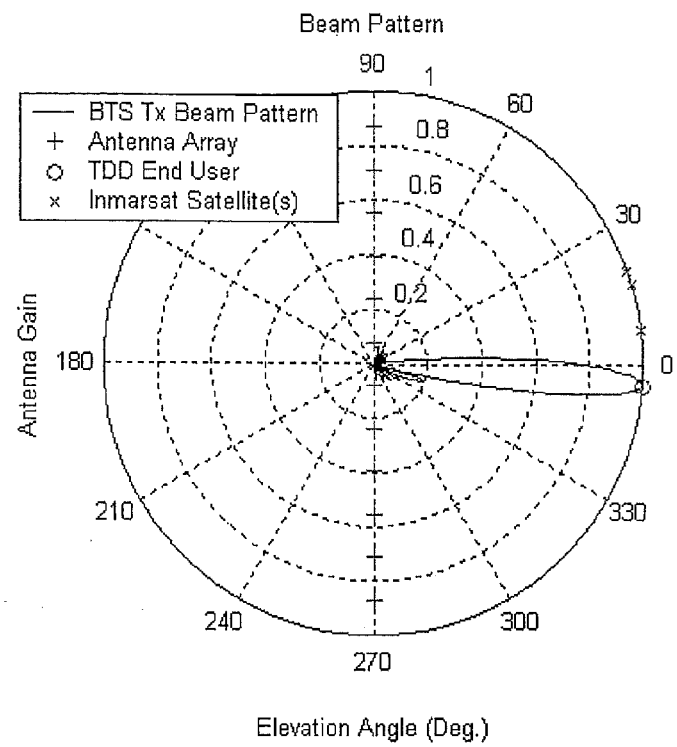
FIG. 9 is a plot of a downlink beam pattern according to some embodiments of the invention when a TCS user is located at −5° elevation and ICS satellites are located at 7, 17 & 20° elevations respectively (−28 dB constraint for the satellites)
Figure 9B:
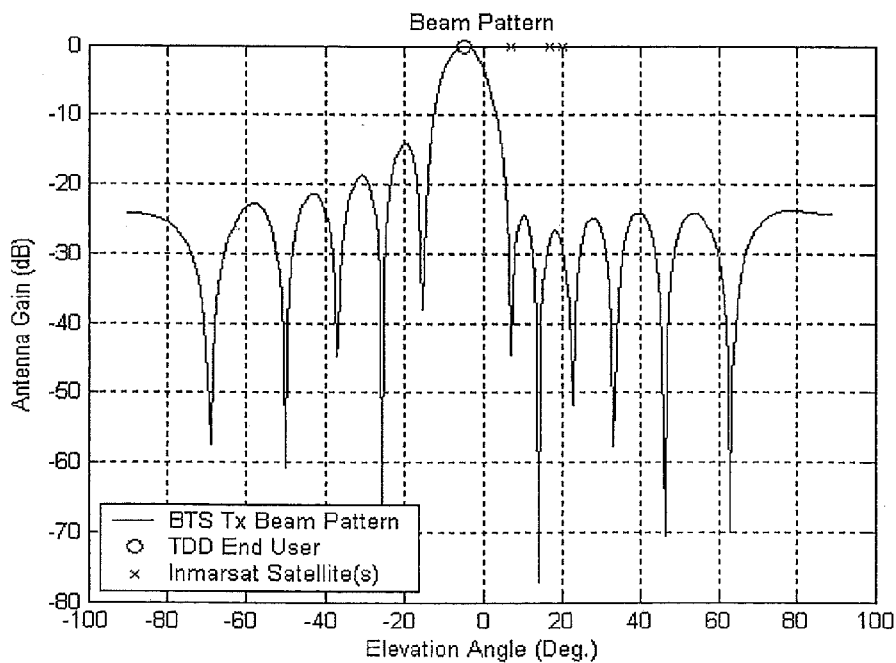
Figure 10A:
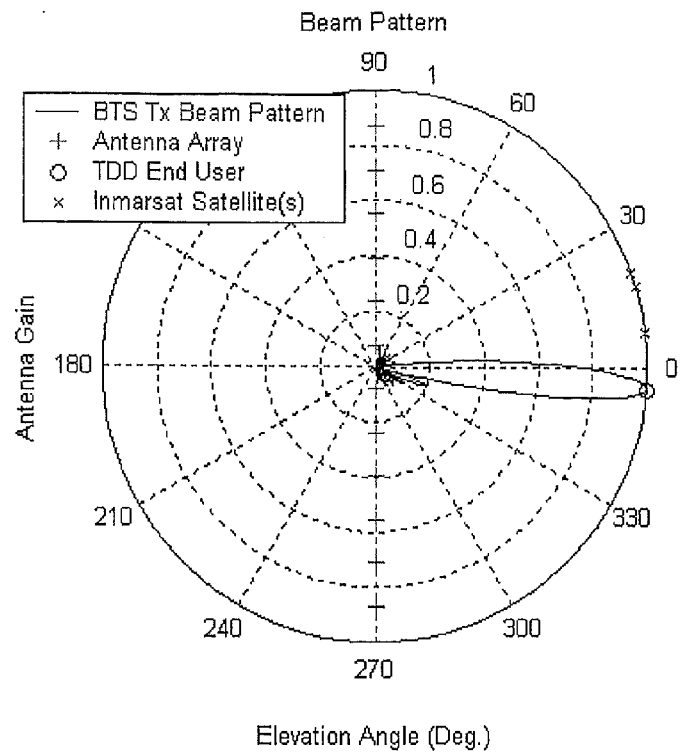
FIG. 10 is a plot of a downlink beam pattern according to some embodiments of the invention when a TCS user is located at −5° elevation and ICS satellites are located at 7, 17 & 20° elevations respectively (−34 dB constraint for the satellites)
Figure 10B:
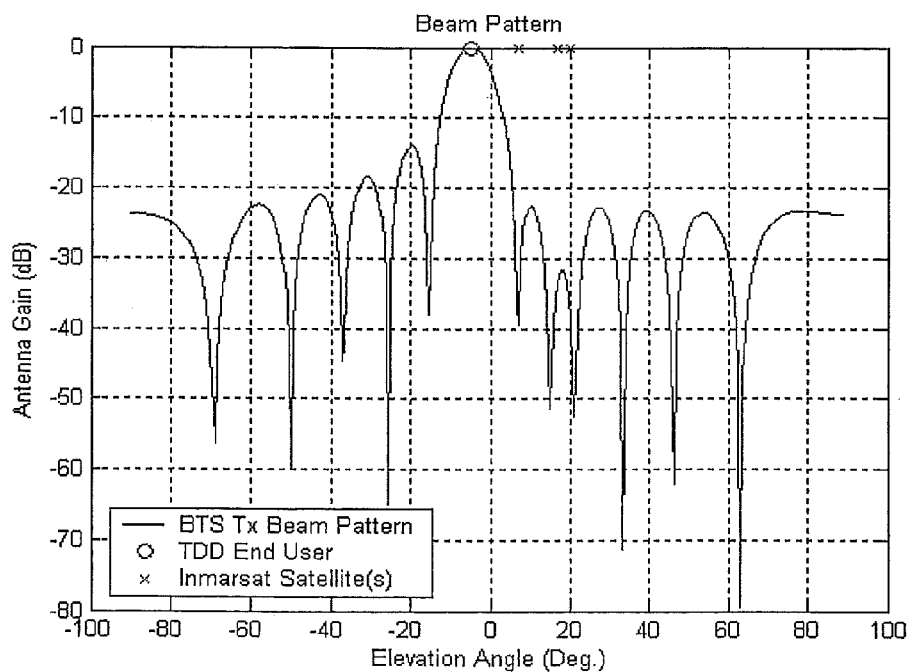

The third example assumes a scenario where three ICS satellites are located at angles of 7, 17 and 20 degrees respectively with the desired TDD end user at angle of −5 degrees. FIGS. 8A/8B, 9A/9B and 10A/10B show the formed beam patterns when the constraint gain against the satellites is set to −20 dB, −28 dB and −34 dB respectively. The resulting average gains for the satellites are about the same as the constraint values respectively for each of the three cases. It can be seen that while the "nulls" against satellites become deeper as deeper constraints are used, the sidelobes in the unconstrained region become higher as well. However, in this example, the sidelobes are still well below −20 dB.

Figure 11:
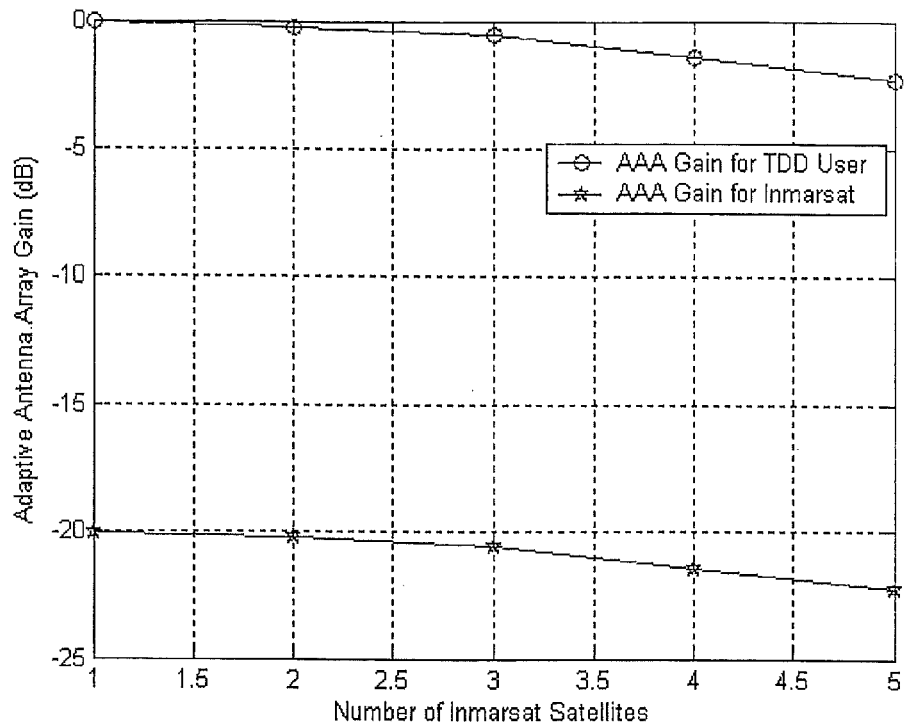
FIG. 11 is a plot of average gains of formed beams according to some embodiments of the invention toward a TCS user and ICS satellites when the TCS user is located at −5° elevation and satellites are uniformly randomly distributed in [0°, 30°] elevation.

When the number of visible ICS satellites becomes large (the high resolution AOA estimation algorithm can handle up to 11 satellites simultaneously), the number of constraint points also increases. To satisfy more constraint points, the beam gain toward the desired TCS user may be sacrificed to some degree due to the adaptive nature of the algorithm, depending on various scenarios. Monte-Carlo simulation results show the statistical performance of the adaptive array in terms of the average beam gain toward the desired TCS user and the average beam gain against the ICS satellites. In the simulation, the number of satellites is varied from 1 to 5 with uniform random distributed within angles of 0 to 30 degrees. The results are based on 1000 independent trials with the beam gain constraint for the satellites being set to −20 dB. FIG. 11 shows the average gains of the formed beam toward the desired user and the satellites. It can be seen that the average gain for the desired user has very little degradation when the number of visible satellites is equal to or less than three. A noticeable beam gain reduction for the desired user begins when number of the visible satellites is equal or greater than four. However, the overall beam gain against the satellites also becomes more negative as the number of the visible satellite increases.

Figure 12:
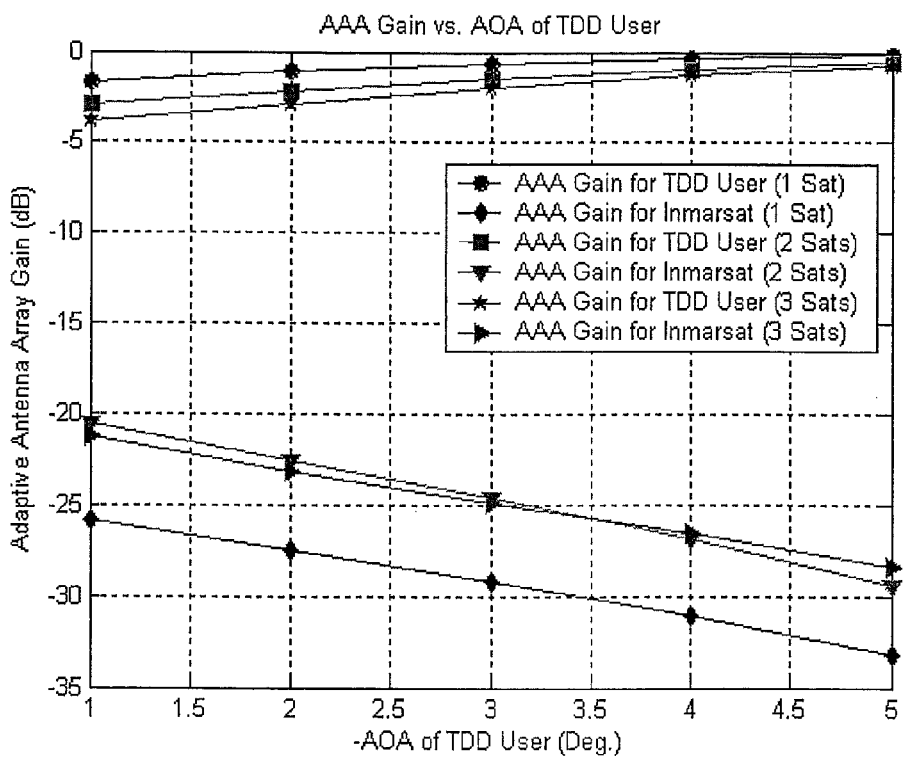
FIG. 12 is a plot of average gains of formed beam according to some embodiments of the invention toward TDD user and ICS satellites when AOA of TDD user varies from −1 to −5° elevation and satellites are uniformly randomly distributed in [0°, 10°] elevation (Algorithm I).

The last example considers the case that a TDD user is located at near horizon with elevation angle from −1 degree to −5 degrees and 1 to 3 ICS satellites are at elevation angles with uniformly random distributed in [0, −10] degrees. For this case, where a TDD user is very close to horizon and the angular separation between the TDD user and one or more ICS satellites is likely very small, using Algorithm II may cause severe gain loss for the desired TDD user because the beamformer tries to satisfy the satellite gain constraint which respects to the desired TDD user and consequently has to overly tilt down the beam pointing position. Algorithm I may provide better performance in this case because the algorithm puts the desired TDD user as priority while trying to minimize the interference with no extra specific constraints. FIG. 12 shows the performance results of the Monte Carlo simulation with Algorithm I. It appears that the algorithm provides more robust performance than Algorithm II, especially for the TDD user at a low elevation angle. The algorithm offers less gain degradation for the TDD user while providing decent nulls toward the satellites. The gain degradation is mild for the TDD user at −1 degree, and approaches zero dB as the TDD user gets −5 degrees. Meanwhile the nulls toward satellite become deeper as the TDD user approaches −5 degree. The algorithm performs the best for the one satellite scenario. For the two and three satellites situations, the beamformer provides slightly better performance for the TDD user in the case of two satellites.

An adaptive antenna system for a BTS according to some embodiments of the invention may reduce inter-system inference from terrestrial cellular systems to independent satellite systems (such as ICS transceivers) that may be operating in the same frequency band as the one used by terrestrial cellular systems. The performance of the adaptive antenna system has been analyzed through simulations. The simulation results have showed that using an adaptive antenna system according to some embodiments of the invention with a vertical uniform linear array of 12 antenna elements along may provide more than 20 dB of isolation toward a satellite regardless of any terrain/building blockage.

In the drawings and specification, there have been disclosed typical embodiments of the invention and, although specific terms are employed, they are used in a generic and descriptive sense only and not for purposes of limitation, the scope of the invention being set forth in the following claims.

What is claimed is:

1. A method of generating a downlink transmission signal from a base transceiver system to a user terminal associated with the base transceiver system, comprising:
obtaining location information for a transceiver of an independent communications system not associated with the base transceiver system;
generating complex transmitting weights for an adaptive antenna associated with the base transceiver system that form a spatial null directed at the transceiver of the independent communications system; and
transmitting a downlink communications signal over the adaptive antenna system to the user terminal using the complex transmitting weights;
wherein obtaining location information for the transceiver of the independent communications system comprises receiving a beacon signal from the transceiver of the independent communications system; and
wherein generating the complex transmitting weights comprises:
forming a uplink antenna pattern using the complex transmitting weights;
receiving the beacon signal using the uplink antenna pattern; and
measuring strength of the beacon signal received using the uplink antenna pattern, wherein the strength of the beacon signal received using the uplink antenna pattern provides an error signal associated with the complex transmitting weights.

2. The method of claim 1, wherein the adaptive antenna comprises a plurality of vertical uniform linear array antennas, and wherein generating complex transmitting weights comprises generating complex transmitting weights that form a spatial null directed at an elevation associated with the transceiver of the independent communications system.

3. The method of claim 1, wherein the beacon signal comprises an unmodulated carrier signal, a control channel signal or a traffic channel signal.

4. The method of claim 1, further comprising adjusting the complex transmitting weights to reduce the strength of the beacon signals.

5. The method of claim 1, wherein transmitting the downlink communications signal comprises transmitting a signal that is Left Hand Circularly Polarized (LHCP), Right Hand Circularly Polarized (RHCP), or Linearly Polarized (LP).

6. The method of claim 1, further comprising receiving the downlink communications system at a user terminal of the communications system.

7. The method of claim 1, wherein the base transceiver system is terrestrially based.

8. A base transceiver system of a communication system, comprising:
an antenna array configured to receive vectors of signals including signals transmitted by user terminals of the communications system and signals transmitted by a transceiver of an independent communications system; and
an electronics system coupled to the antenna array and configured to obtain location information for a transceiver of the independent communications system, to generate complex transmitting weights for the antenna array that form a spatial null directed at the transceiver of the independent communications system, and to transmit a downlink communications signal over the adaptive antenna system to the user terminal using the complex transmitting weights;
wherein the antenna array is configured to receiving a beacon signal from the transceiver of the independent communications system; and
wherein the electronics system is configured to form an uplink antenna pattern using the complex transmitting weights, receive the beacon signal using the uplink antenna pattern, and to measure strength of the beacon signal received using the uplink antenna pattern, wherein the strength of the beacon signal received using the uplink antenna pattern provides an error signal associated with the complex transmitting weights.

9. The base transceiver system of claim 8, wherein the adaptive antenna comprises a plurality of vertical uniform linear array antennas, and wherein the electronics system is configured to generate complex transmitting weights that form a spatial null directed at an elevation associated with the transceiver of the independent communications system.

10. The base transceiver system of claim 8, wherein the beacon signal comprises an unmodulated carrier signal, a control channel signal or a traffic channel signal.

11. The base transceiver system of claim 8, wherein the electronics system is configured to adjust the complex transmitting weights to reduce the strength of the beacon signals.

12. The base transceiver system of claim 8, wherein the antenna array is configured to transmit the downlink communications signal comprises transmitting a signal that is Left Hand Circularly Polarized (LHCP), Right Hand Circularly Polarized (RHCP), or Linearly Polarized (LP).

13. A communications system, comprising:
- a base transceiver system comprising an antenna array configured to receive vectors of signals including signals transmitted by user terminals of the communications system and signals transmitted by a transceiver of an independent communications system, and an electronics system coupled to the antenna array and configured to obtain location information for a transceiver of the independent communications system, to generate complex transmitting weights for the antenna array that form a spatial null directed at the transceiver of the independent communications system, and to transmit a downlink communications signal over the adaptive antenna system to the user terminal using the complex transmitting weights;
- wherein the antenna array is configured to receive a beacon signal from the transceiver of the independent communications system; and
- wherein the electronics system is configures to form an uplink antenna pattern using the complex transmitting weights, receive the beacon signal using the uplink antenna pattern, and to measure strength of the beacon signal received using the uplink antenna pattern, wherein the strength of the beacon signal received using the uplink antenna pattern provides an error signal associated with the complex transmitting weights.

14. The communications system of claim 13, wherein the adaptive antenna comprises a plurality of vertical uniform linear array antennas, and wherein the electronics system is configured to generate complex transmitting weights that form a spatial null directed at an elevation associated with the transceiver of the independent communications system.

15. The communications system of claim 13, wherein the beacon signal comprises an unmodulated carrier signal, a control channel signal or a traffic channel signal.

16. The communications system of claim 13, wherein the electronics system is configured to adjust the complex transmitting weights to reduce the strength of the beacon signals.

17. The communications system of claim 13, wherein the antenna array is configured to transmit the downlink communications signal comprises transmitting a signal that is Left Hand Circularly Polarized (LHCP), Right Hand Circularly Polarized (RHCP), or Linearly Polarized (LP).

18. The communications system of claim 13, further comprising at least one user terminal configured to receive the downlink communications signal.

\* \* \* \* \*

UNITED STATES PATENT AND TRADEMARK OFFICE
CERTIFICATE OF CORRECTION

PATENT NO. : 8,412,126 B2
APPLICATION NO. : 12/752644
DATED : April 2, 2013
INVENTOR(S) : Karabinis et al.

It is certified that error appears in the above-identified patent and that said Letters Patent is hereby corrected as shown below:

In the Specification:

Column 20, Line 7: Please correct " $a_{ICS}{}^{UL}(\theta) = [1 e^{j\Omega} \ldots e^{j(M-1)\Omega}]^T$ "

to read -- $a_{ICS}^{UL}(\theta) = [1 \ e^{j\Omega} \ \ldots \ e^{j(M-1)\Omega}]^T$ --

Column 20, Line 28: Please correct " $A_{ICS} = [a_{ICS}{}^{UL}(\theta_1) a_{ICS}{}^{UL}(\theta_2) \ldots a_{ICS}{}^{UL}(\theta_K)]$ "

to read -- $A_{ICS} = [a_{ICS}^{UL}(\theta_1) \ a_{ICS}^{UL}(\theta_2) \ \cdots \ a_{ICS}^{UL}(\theta_K)]$ --

Column 20, Line 38: Please correct " $y_{TDD}(t) = \sum_{p=0}^{L-1} a_{TDD}^{kUL}(\theta_p) s_k(t) + n(t)$ "

to read -- $y_{TDD}(t) = \sum_{p=0}^{L-1} a_{TDD}^{UL}(\theta_p) \underline{s}_p(t) + \underline{n}(t)$ --

Column 21, Line 38: Please correct " $A^{DL} = [a_{ICS}{}^{DL}(\theta_1), a_{ICS}{}^{DL}(\theta_2), \ldots, a_{ICS}{}^{DL}(\theta_L)]$ "

to read -- $A^{DL} = [a_{ICS}^{DL}(\theta_1), \ a_{ICS}^{DL}(\theta_2), \ \cdots, a_{ICS}^{DL}(\theta_L)]$ --

Column 21, Line 48: Please correct " $A^{UL} = [a_{ICS}{}^{UL}(\theta_1), a_{ICS}{}^{UL}(\theta_2), \ldots, a_{ICS}{}^{UL}(\theta_L)]$ "

to read -- $A^{UL} = [a_{ICS}^{UL}(\theta_1), \ a_{ICS}^{UL}(\theta_2), \ \ldots, a_{ICS}^{UL}(\theta_L)]$ --

Column 21, Line 67: Please correct " $\hat{c}_{ICS}{}^{UL}(\theta_k),$ "

to read -- $\hat{c}_{ICS}^{UL}(\theta_k),$ --

Signed and Sealed this
Twenty-sixth Day of July, 2016

Michelle K. Lee
*Director of the United States Patent and Trademark Office*

CERTIFICATE OF CORRECTION (continued)
U.S. Pat. No. 8,412,126 B2

Column 22, Line 3: Please correct "$\hat{c}_{ICS}^{DL}(\theta_k) = T\hat{c}_{ICS}^{UL}(\theta_k)$, k=1, ..., K"

to read -- $\hat{c}_{ICS}^{DL}(\theta_k) = T\hat{c}_{ICS}^{UL}(\theta_k), \quad k=1, \cdots, K$ --

Column 24, Lines 31-40, Please correct the paragraph to read as below:

$$\left[\hat{c}_{ICS}^{UL}(\theta_1), \cdots, \hat{c}_{ICS}^{UL}(\theta_K)\right] = \hat{E}_s = [\hat{e}_1, \cdots, \hat{e}_K] \quad \in C^{M \times K}$$

By using the transformation matrix $T$ in the estimation of the spatial steering vector $\hat{c}_{ICS}^{UL}(\theta_k)$, from the uplink, the downlink steering vector estimates of the ICS satellites can be obtained by $\hat{c}_{ICS}^{DL}(\theta_k) = T\hat{c}_{ICS}^{UL}(\theta_k), \quad k=1, \cdots, K$. Alternatively, a noise subspace or signal subspace based high-resolution AOA estimation algorithms, such as MUSIC, and MODE, may be used to estimate $\theta_k$. With the estimation of $\theta_k$, the downlink steering vector estimates of the ICS satellites can be obtained by Column 24, Line 48: Please correct "downlink $\hat{c}_{ICS}^{DL}(\theta_k)$; 2)"

to read -- downlink $\hat{c}_{ICS}^{DL}(\theta_k)$; 2) --

Column 24, Line 60: Please correct "$w^H \hat{c}_{ICS}^{DL}(\theta_k) = g$, k=1, ..., K"

to read -- $w^H \hat{c}_{ICS}^{DL}(\theta_k) = g, \quad k=1, \cdots, K$ --

Column 24, Line 67: Please correct "$B = [\hat{h}^{DL}(\phi_1), \hat{c}_{ICS}^{DL}(\theta_1), \ldots, \hat{c}_{ICS}^{DL}(\theta_K)] \in C^{M \times (K+1)}$"

to read -- $B = \left[\hat{h}^{DL}(\varphi_1), \hat{c}_{ICS}^{DL}(\theta_1), \cdots, \hat{c}_{ICS}^{DL}(\theta_K)\right] \in C^{M \times (K+1)}$ --

<u>In the Claims:</u>
Column 30, Claim 13, Line 1: Please correct "configures to"
to read -- configured to --